(12) United States Patent
Takahashi et al.

(10) Patent No.: US 10,397,467 B2
(45) Date of Patent: Aug. 27, 2019

(54) IMAGING APPARATUS, IMAGE PROCESSING DEVICE, IMAGING METHOD, AND COMPUTER-READABLE RECORDING MEDIUM

(71) Applicant: OLYMPUS CORPORATION, Hachioji-shi, Tokyo (JP)

(72) Inventors: Yoshiteru Takahashi, Musashino (JP); Satoshi Hara, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/902,646

(22) Filed: Feb. 22, 2018

(65) Prior Publication Data

US 2018/0255232 A1 Sep. 6, 2018

(30) Foreign Application Priority Data

Mar. 1, 2017 (JP) .................................. 2017-038500

(51) Int. Cl.
| | |
|---|---|
| *H04N 5/232* | (2006.01) |
| *G06F 3/041* | (2006.01) |
| *G06F 3/0482* | (2013.01) |
| *H04N 5/272* | (2006.01) |
| *G06T 7/20* | (2017.01) |

(Continued)

(52) U.S. Cl.
CPC ....... *H04N 5/23216* (2013.01); *G06F 3/0412* (2013.01); *G06F 3/0482* (2013.01); *G06T 7/20* (2013.01); *G06T 11/60* (2013.01); *H04N 5/23229* (2013.01); *H04N 5/23293* (2013.01);

(Continued)

(58) Field of Classification Search
CPC ............... G06F 3/0412; G06F 3/0482; G06K 2009/2045; G06T 7/00; H04N 5/23216; H04N 5/23229; H04N 5/23293; H04N 5/272

See application file for complete search history.

(56) References Cited

U.S. PATENT DOCUMENTS

2003/0184562 A1* 10/2003 Matsumoto ............ H04N 5/272
                                                                       345/620
2003/0214600 A1* 11/2003 Kido ....................... H04N 5/235
                                                                       348/362

(Continued)

FOREIGN PATENT DOCUMENTS

| JP | 2004-056359 A | 2/2004 |
| JP | 2004-207936 A | 7/2004 |

*Primary Examiner* — Amy R Hsu
(74) *Attorney, Agent, or Firm* — Volpe and Koenig, P.C.

(57) ABSTRACT

An imaging apparatus includes: an imaging unit configured to continuously capture images to sequentially generate image data; a combining unit configured to combine a plurality of sets of the image data generated by the imaging unit to generate composite image data; a display unit configured to display a composite image corresponding to the composite image data generated by the combining unit; an operating unit configured to receive an operation for the image data to be left in the composite image selected from among a plurality of sets of the image data combined into the composite image displayed by the display unit; and a control unit configured to cause the combining unit to combine at least two sets of the image data selected in accordance with the operation of the operating unit to generate a new set of the composite image data.

10 Claims, 25 Drawing Sheets

(51) Int. Cl.
*G06T 11/60* (2006.01)
*G06K 9/20* (2006.01)

(52) U.S. Cl.
CPC ..... *H04N 5/272* (2013.01); *G06K 2009/2045* (2013.01); *G06T 2207/30241* (2013.01)

(56) References Cited

U.S. PATENT DOCUMENTS

| | | | |
|---|---|---|---|
| 2006/0007327 A1* | 1/2006 | Nakamura | H04N 5/262 348/239 |
| 2010/0097398 A1* | 4/2010 | Tsurumi | H04N 5/144 345/634 |
| 2013/0176458 A1* | 7/2013 | Van Dalen | H04N 5/232 348/231.99 |
| 2015/0271413 A1* | 9/2015 | Kuo | G11B 27/34 386/230 |

* cited by examiner

IMAGING APPARATUS, IMAGE PROCESSING DEVICE, IMAGING METHOD, AND COMPUTER-READABLE RECORDING MEDIUM

CROSS-REFERENCE TO RELATED APPLICATION

This application is based upon and claims the benefit of priority from Japanese Patent Application No. 2017-038500, filed on Mar. 1, 2017, the entire contents of which are incorporated herein by reference.

BACKGROUND

The present disclosure relates to an imaging apparatus, an image processing device, an imaging method, and a computer-readable recording medium.

Recent imaging apparatuses, such as digital cameras, are known to have a technique which extracts images of an object from a plurality of continuously captured images, sequentially combines the images of the object with a background image in time-series, and obtains a composite image showing a movement trajectory of the object (see JP 2004-56359 A).

SUMMARY

An imaging apparatus according to one aspect of the present disclosure includes: an imaging unit configured to continuously capture images to sequentially generate image data; a combining unit configured to combine a plurality of sets of the image data generated by the imaging unit to generate composite image data; a display unit configured to display a composite image corresponding to the composite image data generated by the combining unit; an operating unit configured to receive an operation for the image data to be left in the composite image selected from among a plurality of sets of the image data combined into the composite image displayed by the display unit; and a control unit configured to cause the combining unit to combine at least two sets of the image data selected in accordance with the operation of the operating unit to generate a new set of the composite image data.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
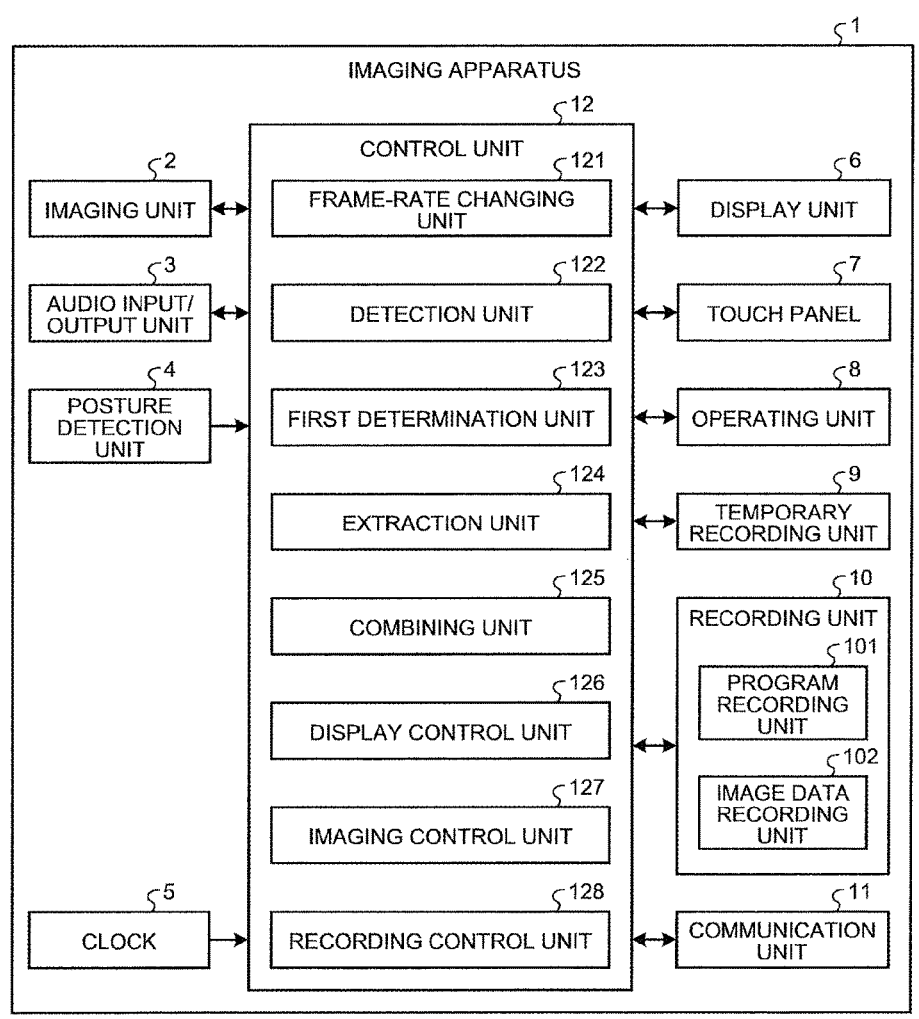
FIG. 1 is a block diagram illustrating a functional configuration of an imaging apparatus according to a first embodiment.

Embodiments will be described below with reference to the drawings. It should be understood that the present disclosure is not limited to the following embodiments. Furthermore, in the drawings, the same portions are denoted by the same reference signs for description. Furthermore, in the following description, a digital still camera continuously capturing image data will be described as an example of an imaging apparatus, but a camcorder, a digital video camera, a mobile phone or tablet terminal having an imaging function, a monitoring camera, an IC recorder having an image capturing function, an endoscope, or a microscope such as a video microscope may be employed in addition to the digital still camera.

First Embodiment

Configuration of Imaging Apparatus

FIG. 1 is a block diagram illustrating a functional configuration of an imaging apparatus according to a first embodiment. An imaging apparatus 1 illustrated in FIG. 1 includes an imaging unit 2, an audio input/output unit 3, a posture detection unit 4, a clock 5, a display unit 6, a touch panel 7, an operating unit 8, a temporary recording unit 9, a recording unit 10, a communication unit 11, and a control unit 12.

The imaging unit 2 images a predetermined field of view under the control of the control unit 12, generates image data, and outputs the image data to the control unit 12. Furthermore, the imaging unit 2 continuously images the predetermined field of view under the control of the control unit 12 and generates a plurality of temporally consecutive image data sets. Still furthermore, the imaging unit 2 continuously images the predetermined field of view at a predetermined frame rate (e.g., 240 fps, 120 fps, 60 fps, 30 fps, 24 fps) under the control of the control unit 12, and generates temporally consecutive moving image data. The imaging unit 2 includes an optical system, an image sensor, a diaphragm, a shutter, and a signal processing unit. The optical system forms an image of a predetermined field of view, the image sensor, such as a charge coupled device (CCD) or a complementary metal oxide semiconductor (CMOS), receives an optical image formed by the optical system to generate image data by photoelectric conversion, the diaphragm controls an amount of incident light condensed by the optical system to adjust exposure, the shutter switches a state of the image sensor between an exposure state and a light shielding state, and the signal processing unit performs analog processing, such as noise reduction processing or gain-up processing, on analog image data generated by the image sensor to perform A/D conversion.

The audio input/output unit 3 outputs acquired audio data to the control unit 12 and outputs audio data input from the control unit 12 to the outside. The audio input/output unit 3 includes a microphone configured to acquire audio data, an A/D converter configured to perform A/D conversion of the audio data acquired by the microphone, a D/A converter configured to perform D/A conversion of digital audio data input from the control unit 12, and a speaker configured to output analog audio data obtained by conversion by the D/A converter to the outside.

The posture detection unit 4 detects a posture of the imaging apparatus 1 or hand shake and outputs a result of the detection to the control unit 12. The posture detection unit 4 includes an acceleration sensor configured to detect an acceleration generated in the imaging apparatus 1, and a gyroscope configured to detect an angle, an angular speed, and an angular acceleration of the imaging apparatus 1. Note that the posture detection unit 4 may additionally include a position detection sensor or a direction sensor using GPS or the like to detect posture information about a posture of the imaging apparatus 1 including a position of the imaging apparatus 1 or an orientation of an imaging direction.

The clock 5 generates date information about date and time at which an image is captured by the imaging unit 2, in addition to a timing function, and outputs this date information to the control unit 12.

Under the control of the control unit 12, the display unit 6 displays an image corresponding to the image data generated by the imaging unit 2, a moving image corresponding to the moving image data generated by the imaging unit 2, or various information about the imaging apparatus 1. Furthermore, the display unit 6 plays back and displays an image corresponding to image data or a moving image corresponding to moving image data. The image data and the moving image data are recorded in the recording unit 10. The display unit 6 includes a liquid crystal display panel or an organic electro luminescence (EL) display panel.

The touch panel 7 is provided overlaid on a display area of the display unit 6, receives a signal input in accordance with a contact position (touch position) with which an external object makes contact, and outputs this signal to the control unit 12 and the like.

The operating unit 8 receives signals input in accordance with various operations of the imaging apparatus 1 and outputs the received signals to the control unit 12 and the like. The operating unit 8 includes a release switch configured to receive inputs of at least a 1st release signal instructing to prepare to capture a still image, and a 2nd release signal instructing to perform image capturing, a moving image switch configured to receive inputs of a start signal instructing the imaging unit to start capturing a moving image, and an end signal instructing the imaging unit to end capturing the moving image, an arrow switch configured to receive inputs of various operation signals for the imaging apparatus 1, and a determination switch configured to receive an input of an instruction signal for determining a setting or the like selected by the arrow switch.

The temporary recording unit 9 temporarily records the image data or the moving image data generated by the imaging unit 2 and various data being processed by the imaging apparatus 1 via the control unit 12. The temporary recording unit 9 includes a memory, such as a synchronous dynamic random access memory (SDRAM).

The recording unit 10 includes a program recording unit 101 configured to record various programs executed by the imaging apparatus 1, and an image data recording unit 102 configured to record the image data or the moving image data generated by the imaging unit 2. The recording unit 10 includes a recording medium, such as a flash memory or a memory card removably mounted to the imaging apparatus 1.

Under the control of the control unit 12, the communication unit 11 performs bidirectional communication with an external device in accordance with a predetermined wireless communication standard to transmit information, such as image data or moving image data, and to receive instruction signals for causing the imaging apparatus 1 to perform various operations, which are transmitted from the external device, and outputs the instruction signals to the control unit 12. Here, the predetermined wireless communication standard includes IEEE802.11a, IEEE802.11b, IEEE802.11n, IEEE802.11g, IEEE802.11ac, Bluetooth (registered trademark), and an infrared communication standard. No that, in the present first embodiment, any wireless communication standard is applicable.

The control unit 12 integrally controls the respective units constituting the imaging apparatus 1. Furthermore, the control unit 12 performs various processing on the image data or the moving image data input from the imaging unit 2, and outputs the image data or the moving image data to any of the display unit 6, the temporary recording unit 9, and the recording unit 10. The control unit 12 includes a general-purpose processor, such as a central processing unit (CPU), a field programmable gate array (FPGA), and an application specific integrated circuit (ASIC). Note that, in the present first embodiment, the control unit 12 functions as an image processing device.

Here, a detailed configuration of the control unit 12 will be described. The control unit 12 includes a frame-rate changing unit 121, a detection unit 122, a first determination unit 123, an extraction unit 124, a combining unit 125, a display control unit 126, an imaging control unit 127, and a recording control unit 128.

The frame-rate changing unit 121 changes the frame rate of the image data captured by the imaging unit 2. For example, the frame-rate changing unit 121 changes the frame rate of the imaging unit 2, from 120 fps to 240 fps.

The detection unit 122 detects an object included in the image corresponding to the image data generated by the imaging unit 2. For example, the detection unit 122 uses a well-known pattern matching technique for an image to detect an object moving in continuous images or a moving image. Note that the detection unit 122 may detect the object included in an image based on a motion vector or features, in addition to the pattern matching.

The first determination unit 123 determines whether the object detected by the detection unit 122 has a depth component of movement in a depth direction of the imaging apparatus, based on temporally successive images. Here, the depth direction represents an optical axis direction of the imaging unit 2. Furthermore, the depth component also includes a diagonal component based on the depth direction of the imaging apparatus.

The extraction unit 124 extracts an area of the object detected by the detection unit 122 from the image corresponding to the image data generated by the imaging unit 2 to generate object image data.

Under the control of the imaging control unit 127, which is described later, the combining unit 125 combines the plurality of image data sets generated by the imaging unit 2 with each other to generate composite image data. Specifically, when the combining unit 125 combines a predetermined number of image data sets, the respective image data sets are multiplied by a coefficient being one divided by the predetermined number and combined with each other. For example, to combine three image data sets with each other, the combining unit 125 multiplies the respective image data sets by ⅓, and then combines the image data sets with each other to generate composite image data.

The display control unit 126 controls a display mode of the display unit 6. Specifically, the display control unit 126 causes the display unit 6 to display the image corresponding to the image data generated by the imaging unit 2, overlaid on the composite image generated by the combining unit 125. Furthermore, the display control unit 126 causes the display unit 6 to display a plurality of image data sets recorded in the temporary recording unit 9 in slow motion at a predetermined display frame rate. For example, when the plurality of image data sets recorded in the temporary recording unit 9 is generated at 120 fps, the display control unit 126 performs control to cause the image data sets to be displayed in the display unit 6 at 15 fps.

The imaging control unit 127 controls the imaging unit 2. Furthermore, the imaging control unit 127 causes the combining unit 125 to combine two or more image data sets selected in accordance with selection operation by the operating unit 8 to generate new composite image data. Note that, in the present first embodiment, the imaging control unit 127 functions as a control unit.

The recording control unit 128 causes the temporary recording unit 9 to record the image data generated by the imaging unit 2 and further causes the image data recording unit 102 to record the image data generated by the imaging unit 2.

Process Performed by Imaging Apparatus

Figure 2:
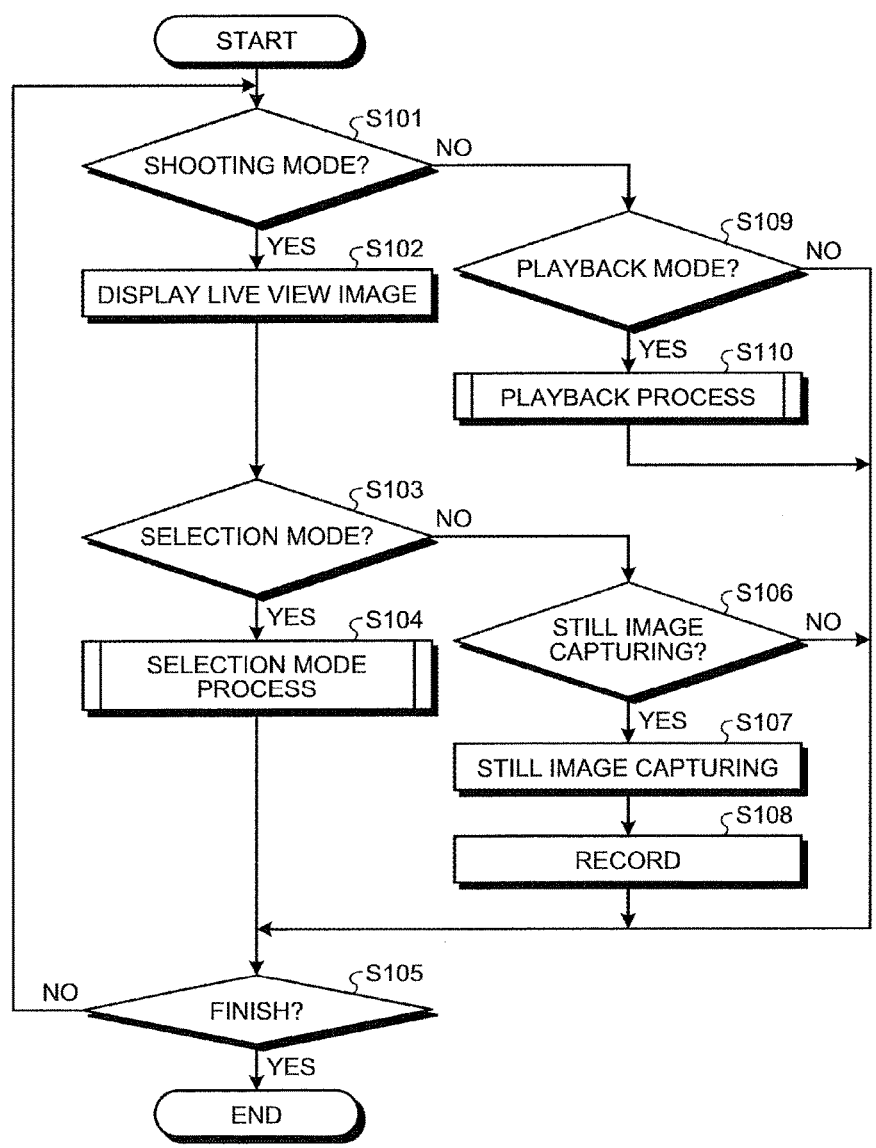
FIG. 2 is a flowchart illustrating an outline of a process performed by the imaging apparatus according to the first embodiment.

Next, a process performed by the imaging apparatus 1 will be described. FIG. 2 is a flowchart illustrating an outline of a process performed by the imaging apparatus 1.

First, as illustrated in FIG. 2, when the imaging apparatus 1 is set to a shooting mode (Step S101: Yes), the display control unit 126 causes the display unit 6 to sequentially display live view images corresponding to image data continuously generated by the imaging unit 2 (Step S102). In this configuration, a predetermined number of frames (e.g., 60 fps or 30 fps) or predetermined data capacity (e.g., data capacity corresponding to one second) of the image data continuously generated by the imaging unit 2 is temporarily recorded in the temporary recording unit 9.

Then, when the imaging apparatus 1 is set to a selection mode (Step S103: Yes), the imaging apparatus 1 performs a selection mode process of causing the display unit 6 to perform sequential slow motion display of a plurality of image data sets recorded in the temporary recording unit 9 in time-series, sequentially combining images of an object in accordance with user's selection operation, and generating composite image data enabling understanding of a movement trajectory of the object (Step S104). Note that the selection mode process will be described in detail later.

Then, when an instruction signal for finishing the present process is input from the operating unit 8 (Step S105: Yes), the imaging apparatus 1 finishes the present process. In contrast, when no instruction signal for finishing the present process is input from the operating unit 8 (Step S105: No), the imaging apparatus 1 returns to Step S101 described above.

In Step S103, when the imaging apparatus 1 is not set to the selection mode (Step S103: No), the imaging apparatus 1 proceeds to Step S106.

Then, the imaging control unit 127 determines whether an instruction signal for capturing a still image is input from the operating unit 8 (Step S106). Specifically, the imaging control unit 127 determines whether a 2nd release signal instructing to capture a still image is input from the operating unit 8. Note that the control unit 12 may determine whether a signal instructing to capture a still image is input by touching the touch panel 7, in addition to the 2nd release signal from the operating unit 8. When the imaging control unit 127 determines that the instruction signal for capturing a still image is input from the operating unit 8 (Step S106: Yes), the imaging apparatus 1 proceeds to Step S107, which is described later. In contrast, when the imaging control unit 127 determines that no instruction signal for capturing a still image is input from the operating unit 8 (Step S106: No), the imaging apparatus 1 proceeds to Step S105, which is described later.

In Step S107, the imaging control unit 127 causes the imaging unit 2 to capture a still image.

Then, the recording control unit 128 records image data generated by the imaging unit 2 capturing the still image in the image data recording unit 102, in accordance with a predetermined format (Step S108). In this configuration, the display control unit 126 may cause the display unit 6 to display an image corresponding to the image data generated by the imaging unit 2 capturing the still image, for a predetermined time period (e.g., 3 seconds). After Step S108, the imaging apparatus 1 proceeds to Step S105.

In Step S101, when the imaging apparatus 1 is not set to the shooting mode (Step S101: No), the imaging apparatus 1 proceeds to Step S109.

Then, when the imaging apparatus 1 is set to a playback mode (Step S109: Yes), the imaging apparatus 1 performs a playback process of playing back and displaying the image data recorded in the image data recording unit 102 (Step S110). Note that the playback process will be described in detail later. After Step S110, the imaging apparatus 1 proceeds to Step S105.

In Step S109, when the imaging apparatus 1 is not set to the playback mode (Step S109: No), the imaging apparatus 1 proceeds to Step S105.

Selection Mode Process

Figure 3:
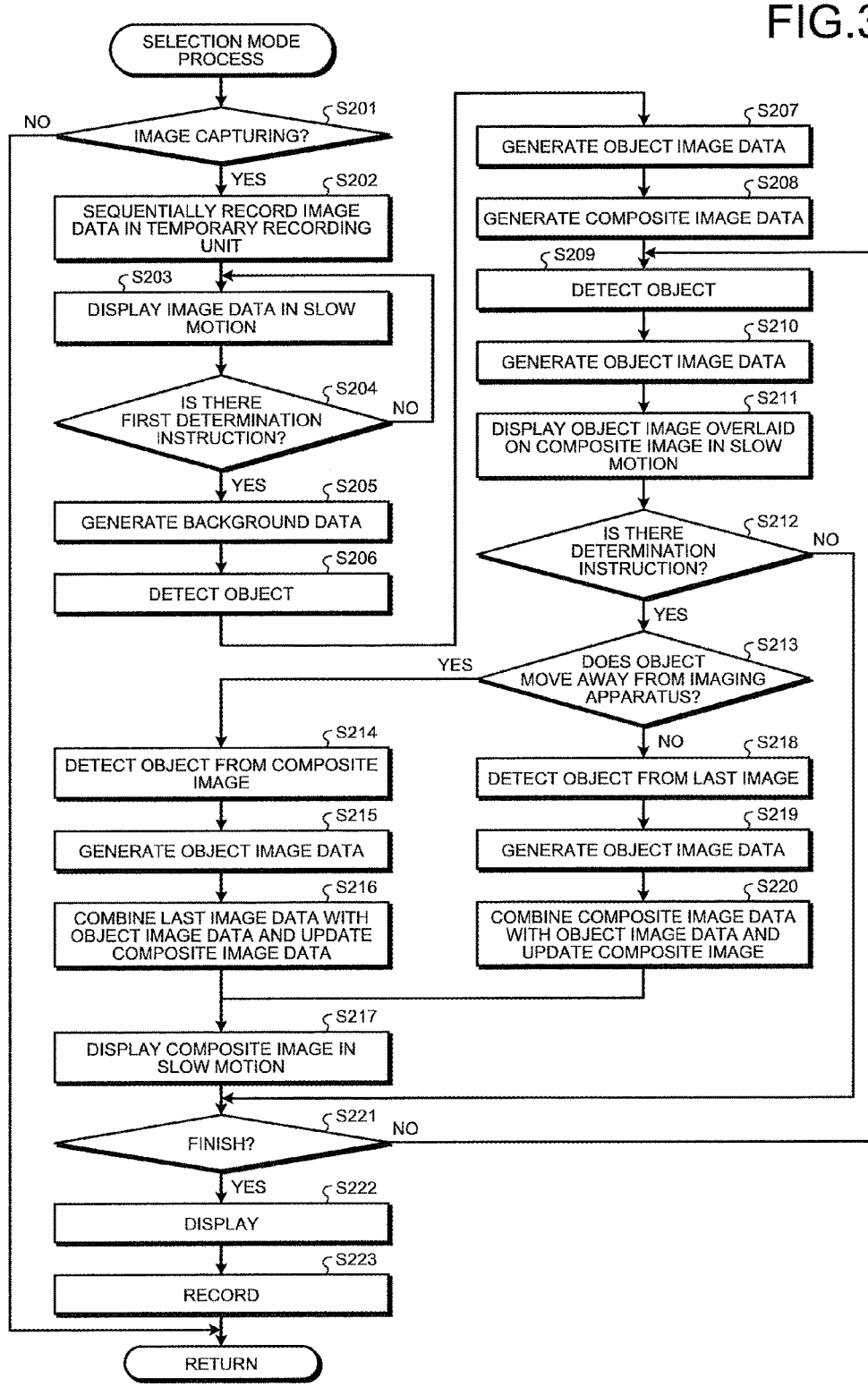
FIG. 3 is a flowchart illustrating an outline of a selection mode process of FIG. 2.

Next, the above-described selection mode process in Step S104 of FIG. 2 will be described in detail. FIG. 3 is a flowchart illustrating the detailed selection mode process.

As illustrated in FIG. 3, the imaging control unit 127 determines, first, whether an instruction signal for performing image capturing is input from the operating unit 8 (Step S201). Specifically, the imaging control unit 127 determines whether a 1st release signal instructing to prepare to capture an image is input from the operating unit 8. As a matter of course, in addition to the 1st release signal, the imaging control unit 127 may determine whether the instruction signal for performing image capturing (e.g., 2nd release signal) is input from the operating unit 8 or an instruction signal for performing image capturing is input from the touch panel 7. Furthermore, merely touch operation may be only performed on the touch panel 7. When the imaging control unit 127 determines that the instruction signal for performing image capturing is input from the operating unit 8 (Step S201: Yes), the imaging apparatus 1 proceeds to Step S202, which is described later. In contrast, the imaging control unit 127 determines that no instruction signal for performing image capturing is input from the operating unit 8 (Step S201: No), the imaging apparatus 1 returns to a main routine of FIG. 2 described above.

Figure 4:
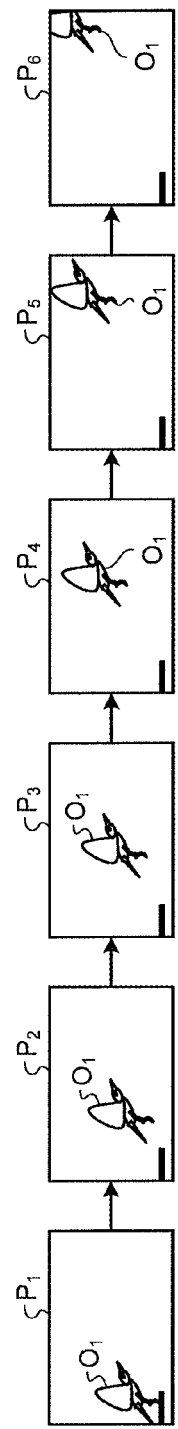
FIG. 4 is a diagram illustrating image data continuously sequentially generated by an imaging unit of the imaging apparatus according to the first embodiment.

In Step S202, the recording control unit 128 causes the temporary recording unit 9 to sequentially record image data generated by the imaging unit 2. Specifically, as illustrated in FIG. 4, the recording control unit 128 causes the temporary recording unit 9 to sequentially record a plurality of image data sets continuously generated by the imaging unit 2 (e.g., images $P_1$ to $P_6$ illustrated in FIG. 4). In this configuration, the frame-rate changing unit 121 may change a frame rate at which the imaging unit 2 generates the image data to a high-speed frame rate (e.g., 60 fps to 120 fps).

Then, the display control unit 126 causes the display unit 6 to display the image data sequentially recorded in the temporary recording unit 9 in slow motion, in time-series (Step S203). Specifically, when the temporary recording unit 9 records image data generated by the imaging unit 2 at a predetermined frame rate for a predetermined time period or records the image data of a predetermined number of frames, the display control unit 126 causes the display unit 6 to display the image data in slow motion, at a frame rate being 1 divided by an integer larger than 1 relative to the frame rate of the imaging unit 2. For example, when the temporary recording unit 9 records image data generated by the imaging unit 2 at 120 fps for two or more seconds, the display control unit 126 causes the display unit 6 to display the image data at 15 fps (in eight times slower motion). Furthermore, the display control unit 126 may appropriately change the speed of the slow motion display in accordance with the operation of the operating unit 8. In this configuration, the control unit 12 may cause the audio input/output unit 3 to slow down the playback of audio data captured by the audio input/output unit 3, in accordance with images displayed in slow motion.

Then, the imaging control unit 127 determines whether the first determination instruction for the images displayed in slow motion by the display unit 6, is given from the operating unit 8 or the touch panel 7 (Step S204). Specifically, the imaging control unit 127 determines whether the 2nd release signal for instructing to perform image capturing is input from the operating unit 8 or a touch signal is input from the touch panel 7. When the imaging control unit 127 determines that the first determination instruction for the images displayed in slow motion by the display unit 6 is given from the operating unit 8 or the touch panel 7 (Step S204: Yes), the imaging apparatus 1 proceeds to Step S205, which is described later. In contrast, when the imaging control unit 127 determines that no first determination instruction for the images displayed in slow motion by the display unit 6 is given from the operating unit 8 or the touch panel 7 (Step S204: No), the imaging apparatus 1 returns to Step S203 described above.

Figure 5:
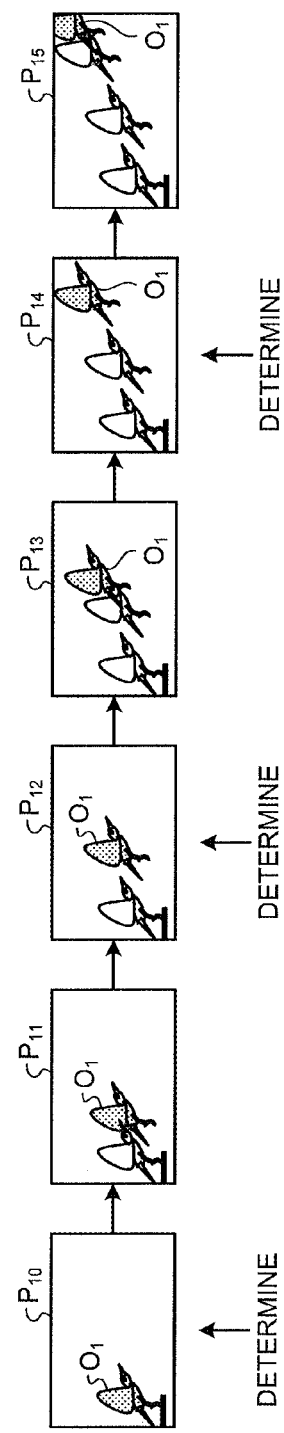
FIG. 5 is a diagram illustrating an example of images sequentially displayed in time-series by a display unit of the imaging apparatus according to the first embodiment.

In Step S205, at a time before the first determination instruction is provided or at a time when the first determination instruction is given, the imaging control unit 127 causes the combining unit 125 to generate background data from the image data recorded in the temporary recording unit 9. Specifically, as illustrated in FIG. 5, when the determination instruction is given from the operating unit 8 or the touch panel 7 at a time when the display unit 6 displays an image $P_{10}$, the imaging control unit 127 causes the combining unit 125 to generate, for example, image data prior to the image $P_1$ illustrated in FIG. 4, as the background data. Note that the combining unit 125 may generate image data recorded in the temporary recording unit 9 at a time when the first determination instruction is given as illustrated in FIG. 5 (e.g., the image $P_1$ illustrated in FIG. 4) as the background data.

Then, the detection unit 122 detects an object from image data of a next frame recorded in the temporary recording unit 9 (Step S206). Specifically, the detection unit 122 detects an object $O_1$ from the image $P_1$ illustrated in FIG. 4. In this configuration, the detection unit 122 may detect the object $O_1$ by using temporally successive image data, a predetermined template, or a motion vector or may detect an area having predetermined features as the object. Note that, in FIG. 4, the detection unit 122 detects one bird as the object $O_1$, but may detect a plurality of birds. As a matter of course, the detection unit 122 may detect as the object a moving body that is in motion or may detect the object by using a learned model.

Then, the extraction unit 124 extracts an area of the object detected by the detection unit 122 from the image data to generate object image data (Step S207). Specifically, the extraction unit 124 extracts an area of the object $O_1$ detected from the image $P_1$ by the detection unit 122 to generate the object image data.

Then, the imaging control unit 127 causes the combining unit 125 to combine the object image data generated by the extraction unit 124 with the background data generated in Step S205 to generate composite image data (Step S208). Specifically, the imaging control unit 127 causes the combining unit 125 to generate the composite image data obtained by combining the background data and the object image data generated by the extraction unit 124 (e.g., a composite image $P_{10}$ illustrated in FIG. 5).

Then, the detection unit 122 detects the object from image data of a next frame recorded in the temporary recording unit 9 (Step S209). Specifically, the detection unit 122 detects the object $O_1$ from the image $P_2$ illustrated in FIG. 4.

Then, the extraction unit 124 extracts an area of the object detected by the detection unit 122 from the image data to generate object image data (Step S210).

Then, the display control unit 126 causes the display unit 6 to display an object image corresponding to the object image data generated by the extraction unit 124, overlaid on a composite image corresponding to the composite image data generated by the combining unit 125, in slow motion (Step S211). Specifically, as illustrated in FIG. 5, the display control unit 126 causes the display unit 6 to display an image $P_{11}$ obtained by overlaying the object image $O_1$ on the composite image $P_{10}$, in slow motion. In this configuration, the display control unit 126 multiplies each of the composite image data of the composite image $P_{10}$ and the object image data of the object image $O_1$ by a coefficient of ½ to cause the display unit 6 to display the composite image $P_{10}$ and the object image $O_1$ at a predetermined ratio, for example, at a ratio of 1:1. As a matter of course, the display control unit 126 may appropriately change the ratio of the composite image $P_{10}$ to the object image $O_1$, and may multiply the composite image data of the composite image $P_{10}$ by a coefficient of 0.4 and multiply the object image data of the object image $O_1$ by a coefficient of 0.6 to cause the display unit 6 to display the composite image $P_{10}$ and the object image $O_1$ at a ratio of, for example, 4:6.

Then, when a determination instruction for a moving image displayed in slow motion by the display unit 6 is given from the operating unit 8 or the touch panel 7 (Step S212: Yes), the imaging apparatus 1 proceeds to Step S213, which is described later. In contrast, when no determination instruction for the moving image displayed in slow motion by the display unit 6 is given from the operating unit 8 or the touch panel 7 (Step S212: No), the imaging apparatus 1 proceeds to Step S221, which is described later.

In Step S213, the first determination unit 123 determines whether the object in an image corresponding to image data of the last frame recorded in the temporary recording unit 9 moves away from the imaging apparatus 1. Specifically, based on the image data of the last frame and image data of a preceding frame temporally adjacent to the last frame, the first determination unit 123 uses any one or more of the area of the object detected by the detection unit 122, a motion vector of the object, and a distance from the imaging apparatus 1 to the object to determine whether the object moves away from the imaging apparatus 1. For example, when the distance to the object in the last frame is larger than the distance to the object in the preceding frame, the first determination unit 123 determines that an object moves away from the imaging apparatus 1. Here, "the object moves away from the imaging apparatus 1" represents that the object is moved in a depth direction (also including an optical axis direction and a diagonal direction of the imaging apparatus 1). When the first determination unit 123 determines that an object moves away from the imaging apparatus 1 (Step S213: Yes), the imaging apparatus 1 proceeds to Step S214, which is described later. In contrast, when the first determination unit 123 determines that an object does not move away from the imaging apparatus 1 (Step S213: No), the imaging apparatus 1 proceeds to Step S218, which is described later.

In Step S214, the detection unit 122 detects the object from a composite image. Specifically, the detection unit 122 detects the object $O_1$ from the composite image displayed by the display unit 6, for example, a composite image $P_{11}$ illustrated in FIG. 5.

Then, the extraction unit 124 extracts an area of the object detected from the composite image by the detection unit 122 to generate object image data (Step S215).

Then, the imaging control unit 127 causes the combining unit 125 to combine the last image data with the object image data generated by the extraction unit 124 to update the composite image data (Step S216). Thus, even when the object moves in the depth direction relative to the imaging apparatus 1, the background sequentially combined is updated with the last image data as the background data, and the trajectory of the object has a natural state. At this time, the imaging control unit 127 causes the combining unit 125 to combine the last image data with the object image data so that a coefficient by which the last image data is multiplied is larger than a coefficient by which the object image data is multiplied. For example, the imaging control unit 127 sets the coefficient by which the last image data is multiplied to 0.7 and the coefficient by which the object image data is multiplied to 0.3, and causes the combining unit 125 to generate composite image data for update. Thus, with increasing distance to the object from the imaging apparatus 1, contrast on the image increases, and the trajectory of the object moving in the depth direction can be made clear.

Then, the display control unit 126 causes the display unit 6 to display a composite image corresponding to the composite image data updated by the combining unit 125 in slow motion (Step S217). After Step S217, the imaging apparatus 1 proceeds to Step S221, which is described later.

In Step S218, the detection unit 122 detects the object from the last image corresponding to the last image data recorded in the temporary recording unit 9. For example, the object $O_1$ is detected from the image $P_3$ illustrated in FIG. 4.

Then, the extraction unit 124 extracts an area of the object detected from the last image by the detection unit 122 to generate object image data (Step S219).

Then, the imaging control unit 127 causes the combining unit 125 to combine the composite image data with the object image data generated by the extraction unit 124 to update the composite image corresponding to the composite image data (Step S220). Specifically, as illustrated in FIG. 5, the imaging control unit 127 causes the combining unit 125 to combine the composite image data with the object image data to apply an update to a composite image $P_{12}$. In this configuration, as illustrated in FIG. 5, when the determination instruction is given from the operating unit 8 or the touch panel 7, the imaging apparatus 1 proceeds to Step S217, which is described later, after Step S220.

In Step S221, the control unit 12 determines whether the selection mode process is finished for all pieces of the image data recorded in the temporary recording unit 9 (Step S221). When the control unit 12 determines that the selection mode process is finished for all pieces of the image data recorded in the temporary recording unit 9 (Step S221: Yes), the imaging apparatus 1 proceeds to Step S222, which is described later. In contrast, when the control unit 12 determines that the selection mode process is not finished for all of the image data recorded in the temporary recording unit 9 (Step S221: No), the imaging apparatus 1 returns to Step S209 described above. In this configuration, as illustrated in FIG. 5, the display control unit 126 causes the display unit 6 to display object image data combined with composite image data in slow motion. As shown by composite image $P_{13}$ to composite image $P_{15}$ in FIG. 5, the object image data is generated by sequentially extracting the object $O_1$ by the extraction unit 124, and the object $O_1$ is detected from the image $P_4$ to image $P_6$ by the detection unit 122. At this time, the imaging control unit 127 causes the combining unit 125 to combine the object image with the composite image in accordance with a determination instruction from the operating unit 8 or the touch panel 7 to generate the composite image $P_{13}$, the composite image $P_{15}$, and the composite image $P_{16}$ illustrated in FIG. 5. Thus, the user can obtain a composite image showing the trajectory of the object $O_1$ reflecting a desired position or state of the object. Note that the control unit 12 may determine whether to finish the selection mode, based on determination whether the image data has a capacity large enough to be recorded in the temporary recording unit 9, in addition to the finish of the selection mode process for all of the image data recorded in the temporary recording unit 9. As a matter of course, the control unit 12 may determine whether to finish the selection mode, in accordance with the operation of the operating unit 8 or touch panel 7.

Figure 6:
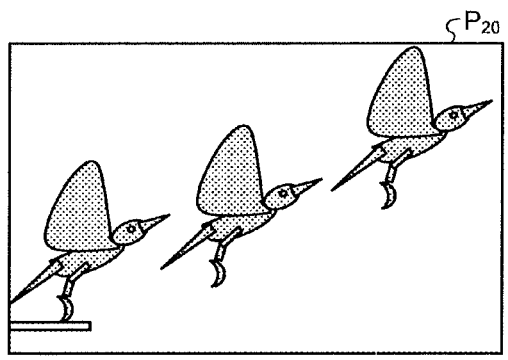
FIG. 6 is a diagram illustrating an example of a composite image displayed by the display unit of the imaging apparatus according to the first embodiment.

In Step S222, the display control unit 126 causes the display unit 6 to display a composite image corresponding to the last composite image data generated by the combining unit 125. Specifically, as illustrated in FIG. 6, the display control unit 126 causes the display unit 6 to display a composite image $P_{20}$ corresponding to the last composite image data generated by the combining unit 125.

Then, the recording control unit 128 records the last composite image data generated by the combining unit 125 in the image data recording unit 102 (Step S223). After Step S223, the imaging apparatus 1 returns to the main routine of FIG. 2.

Playback Process

Figure 7:
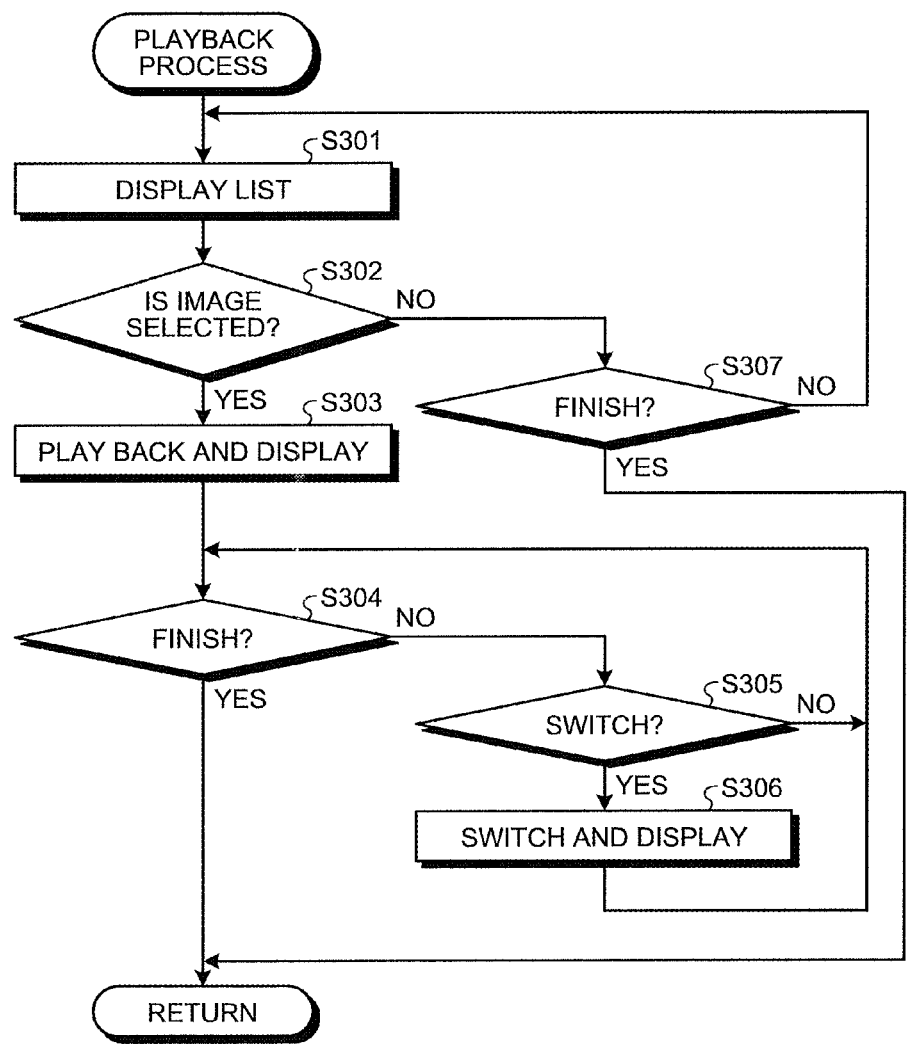
FIG. 7 is a flowchart illustrating an outline of a playback process of FIG. 2.

Next, the above-described playback process in Step S110 of FIG. 2 will be described in detail. FIG. 7 is a flowchart illustrating an outline of the playback process performed by the imaging apparatus 1.

As illustrated in FIG. 7, first, the display control unit 126 causes the display unit 6 to display a list of a plurality of thumbnail images corresponding to a plurality of image data sets recorded in the image data recording unit 102 (Step S301).

Then, when an image is selected from a plurality of thumbnail images displayed in the list by the display unit 6 via the operating unit 8 or the touch panel 7 (Step S302: Yes), the display control unit 126 causes the display unit 6 to play back and display image data of the selected image (Step S303).

Then, when an instruction signal for finishing the playback is input from the operating unit 8 (Step S304: Yes), the imaging apparatus 1 returns to the main routine of FIG. 2. In contrast, when no instruction signal for finishing the playback is input from the operating unit 8 (Step S304: No), the imaging apparatus 1 proceeds to Step S305, which is described later.

In Step S305, when an instruction signal for switching an image to be displayed by the display unit 6 is input via the operating unit 8 or the touch panel 7 (Step S305: Yes), the display control unit 126 causes the display unit 6 to display the image to be displayed by the display unit 6 switched to an image according to the operation (Step S306). After Step S306, the imaging apparatus 1 returns to Step S304 described above.

In Step S305, no instruction signal for switching the image to be displayed by the display unit 6 is input via the operating unit 8 or the touch panel 7 (Step S305: No), the imaging apparatus 1 returns to Step S304 described above.

In Step S302, when no image is selected from the plurality of images displayed in the list by the display unit 6 via the operating unit 8 or the touch panel 7 (Step S302: No), the imaging apparatus 1 proceeds to Step S307.

Then, when the instruction signal for finishing the playback is input from the operating unit 8 (Step S307: Yes), the imaging apparatus 1 returns to the main routine of FIG. 2 described above. In contrast, when no instruction signal for finishing the playback is input from the operating unit 8 (Step S307: No), the imaging apparatus 1 returns to Step S301 described above.

According to the first embodiment described above, the imaging control unit 127 causes the combining unit 125 to combine two or more image data sets selected in accordance with selection operation performed by the operating unit 8 to generate new composite image data. Thus, a composite image in which a position or a state of an object desired by the user is reflected can be obtained.

Furthermore, according to first embodiment, whenever image data is generated by the imaging unit 2, the display control unit 126 causes the display unit 6 to display an image to be overlaid on a composite image displayed by the display unit 6 updated to the last image. Thus, the position or the state of the object desired by the user can be intuitively understood.

Furthermore, according to the first embodiment, the display control unit 126 causes the display unit 6 to display a composite image and the last image in slow motion at a frame rate being 1 divided by an integer larger than 1 relative to the frame rate of the imaging unit 2. Thus, the object can be readily combined to the composite image at a position desired by the user.

Furthermore, according to the first embodiment, when an instruction signal is input from the operating unit 8, the imaging control unit 127 causes the combining unit 125 to combine the last image corresponding to the last image data generated by the imaging unit 2 with a composite image to update composite image data. Thus, user's will can be readily reflected in the composite image.

Furthermore, according to the first embodiment, the imaging control unit 127 causes the combining unit 125 to combine an object image corresponding to object image data generated by the extraction unit 124 with a composite image to update the composite image data. Thus, the composite image data having a trajectory in which only an object moves can be obtained.

Furthermore, according to the first embodiment, when the first determination unit 123 determines that an object moves away from the imaging apparatus 1, the imaging control unit 127 causes the combining unit 125 to combine the last image with an object image extracted from a composite image by the extraction unit 124 to update composite image data. Thus, even if the object moves in the depth direction, the composite image having a smooth trajectory of the moving object can be obtained.

Second Embodiment

Next, a second embodiment will be described. The present second embodiment includes the same configurations as those of the above-described imaging apparatus 1 according to the first embodiment, and is different in the selection mode process and the playback process which are performed by the imaging apparatus. Specifically, in the above-described first embodiment, the position or the state of the object combined with a composite image is selected during image capturing, but in the present second embodiment, the position or the state of the object combined with a composite image is selected after image capturing. A selection mode process and a playback process performed by an imaging apparatus according to the present second embodiment will be described below. Note that configurations the same as those of the above-described imaging apparatus 1 according to the first embodiment are denoted by the same reference signs, and the description thereof will be omitted.

Selection Mode Process

Figure 8:
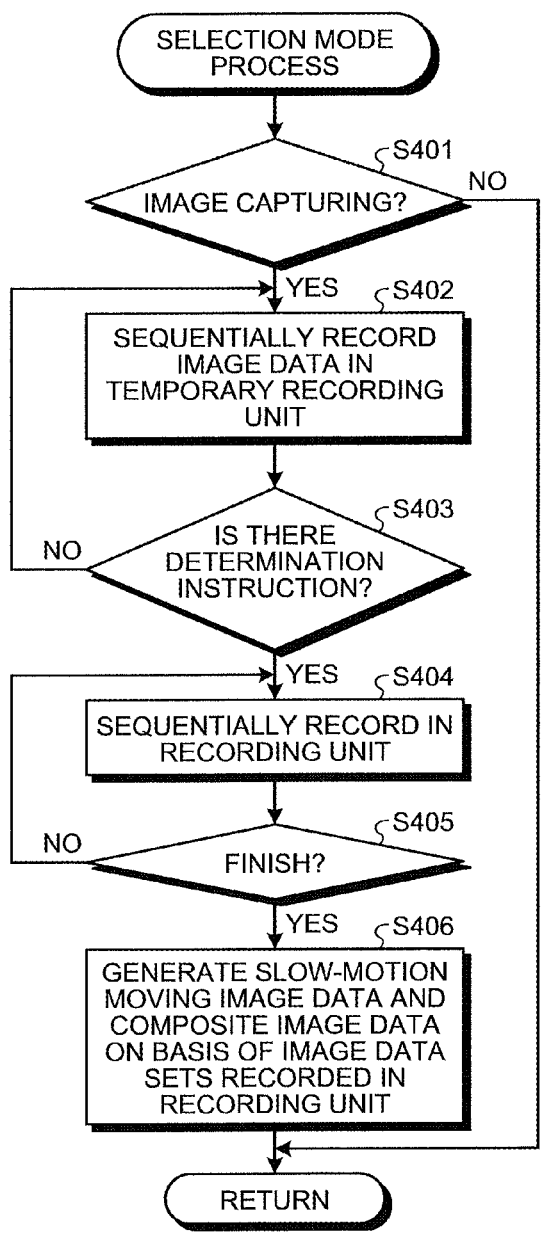
FIG. 8 is a flowchart illustrating an outline of a selection mode process performed by an imaging apparatus according to a second embodiment.

FIG. 8 is a flowchart illustrating an outline of the selection mode process performed by the imaging apparatus 1 according to the present second embodiment.

As illustrated in FIG. 8 the control unit 12 determines, first, whether an instruction signal for performing image capturing is input from the operating unit 8 or the touch panel 7 (Step S401). When the control unit 12 determines that the instruction signal for performing image capturing is input from the operating unit 8 or the touch panel 7 (Step S401: Yes), the imaging apparatus 1 proceeds to Step S402, which is described later. In contrast, when the control unit 12 determines that no instruction signal for performing image capturing is input from the operating unit 8 or the touch panel 7 (Step S401: No), the imaging apparatus 1 returns to the main routine of FIG. 2 described above.

In Step S402, the recording control unit 128 causes the temporary recording unit 9 to sequentially record image data generated by the imaging unit 2.

Then, the control unit 12 determines whether a determination instruction is input from the operating unit 8 or the touch panel 7 (Step S403). When the control unit 12 determines that the determination instruction is input from the operating unit 8 or the touch panel 7 (Step S403: Yes), the imaging apparatus 1 proceeds to Step S404, which is described later. In contrast, the control unit 12 determines that no determination instruction is input from the operating unit 8 or the touch panel 7 (Step S403: No), the imaging apparatus 1 proceeds to Step S402 described above.

In Step S404, the recording control unit 128 records image data of a predetermined number of frames (e.g., 30 frames) recorded in the temporary recording unit 9, in the image data recording unit 102 of the recording unit 10, and sequentially records the image data generated by the imaging unit 2 in the recording unit 10.

Then, the control unit 12 determines whether an instruction signal for finishing image capturing is input from the operating unit 8 or the touch panel 7 (Step S405). When the control unit 12 determines that the instruction signal for finishing image capturing is input from the operating unit 8 or the touch panel 7 (Step S405: Yes), the imaging apparatus 1 proceeds to Step S406, which is described later. In contrast, when the control unit 12 determines that no instruction signal for finishing image capturing is input from the operating unit 8 or the touch panel 7 (Step S405: No), the imaging apparatus 1 returns to Step S404 described above.

In Step S406, the combining unit 125 generates slow-motion moving image data and composite image data, based on a plurality of image data sets recorded in the image data recording unit 102 of the recording unit 10. Specifically, when generating the composite image data, the combining unit 125 multiplies the plurality of image data sets recorded in the image data recording unit 102 by a coefficient multiplied by a predetermined coefficient (e.g., 1 divided by the number of image data sets), to sequentially combine the respective image data sets, and the composite image data is generated. For example, the number of image data sets is ten, the combining unit 125 multiplies the respective image data sets by 0.1 to generate the composite image data. Furthermore, when generating the slow-motion moving image data, the combining unit 125 changes a frame rate to display the plurality of image data sets recorded in the image data recording unit 102 at a predetermined frame rate (e.g., 240 fps), and the slow-motion moving image data is generated. After Step S406, the imaging apparatus 1 returns to the main routine of FIG. 2 described above.

Playback Process

Figure 9:
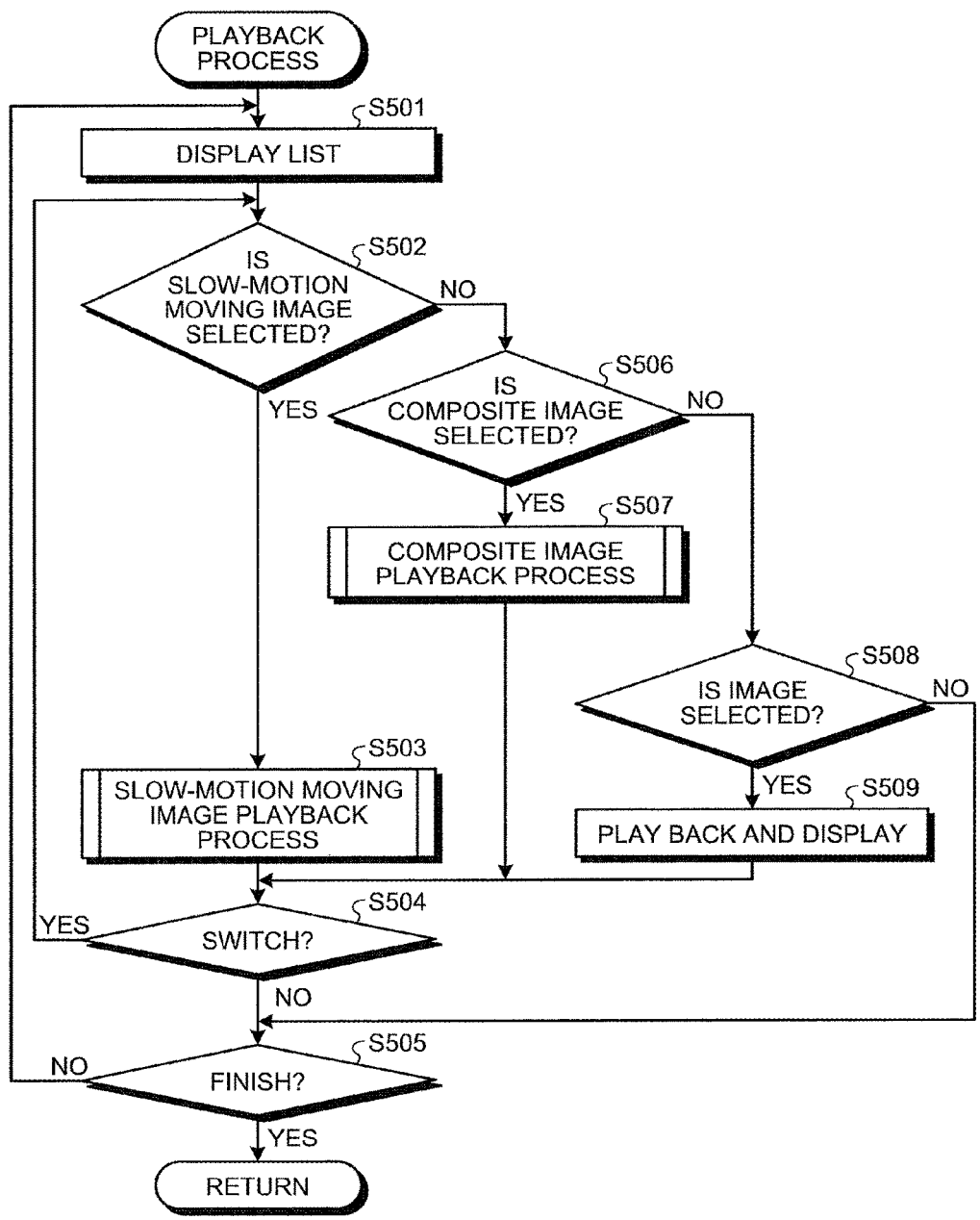
FIG. 9 is a flowchart illustrating an outline of a playback process performed by the imaging apparatus according to the second embodiment.

Next, the playback process performed by the imaging apparatus 1 according to the present second embodiment will be described. FIG. 9 is a flowchart illustrating an outline of the playback process performed by the imaging apparatus 1 according to the present second embodiment.

As illustrated in FIG. 9, first, the display control unit 126 causes the display unit 6 to display a list of a plurality of thumbnail images corresponding to the plurality of image data sets recorded in the image data recording unit 102 and a plurality of thumbnail images corresponding to a plurality of moving image data sets (Step S501).

Then, when a slow-motion moving image is selected from the plurality of thumbnail images displayed in the list by the display unit 6 via the operating unit 8 or the touch panel 7 (Step S502: Yes), the imaging apparatus 1 performs a slow-motion moving image playback process of generating composite image data showing a trajectory of the object, in accordance with the user's operation, while playing back the slow-motion moving image (Step S503). Note that the slow-motion moving image playback process will be described in detail later. In this configuration, the control unit 12 may cause the audio input/output unit 3 to slowly play back audio data captured by the audio input/output unit 3 in accordance with a moving image displayed in slow motion. After Step S503, the imaging apparatus 1 proceeds to Step S504.

Then, when an instruction signal for switching an image to be displayed by the display unit 6 is input via the operating unit 8 or the touch panel 7 (Step S504: Yes), the imaging apparatus 1 returns to Step S502 described above. In contrast, when no instruction signal for switching an image to be displayed by the display unit 6 is input via the operating unit 8 or the touch panel 7 (Step S504: No), the imaging apparatus 1 proceeds to Step S505, which is described later.

In Step S505, when an instruction signal for finishing the playback is input from the operating unit 8 (Step S505: Yes), the imaging apparatus 1 returns to the main routine of FIG. 2 described above. In contrast, when no instruction signal for finishing the playback is input from the operating unit 8 (Step S505: No), the imaging apparatus 1 returns to Step S501 described above.

In Step S502, when no slow-motion moving image is selected from the plurality of thumbnail images displayed in the list by the display unit 6 via the operating unit 8 or the touch panel 7 (Step S502: No), the imaging apparatus 1 proceeds to Step S506.

Then, when a composite image is selected from the plurality of thumbnail images displayed in the list by the display unit 6 (Step S506: Yes), the imaging apparatus 1 performs a composite image playback process of positioning or erasing image data included in the composite image data in accordance with the user's operation, while playing back the composite image data on the display unit 6 (Step S507). Note that the content of the composite image playback process will be described in detail later. After Step S507, the imaging apparatus 1 proceeds to Step S504.

In Step S506, when no composite image is selected from the plurality of thumbnail images displayed in the list by the display unit 6 (Step S506: No), the imaging apparatus 1 proceeds to Step S508.

Then, when an image is selected from the plurality of thumbnail images displayed in the list by the display unit 6 (Step S508: Yes), the display control unit 126 causes the display unit 6 to play back and display image data of the selected image (Step S509). After Step S509, the imaging apparatus 1 proceeds to Step S504.

In Step S508, when no image is selected from the plurality of thumbnail images displayed in the list by the display unit 6 (Step S508: No), the imaging apparatus 1 proceeds to Step S505.

Slow-motion Moving Image Playback Process

Figure 10:
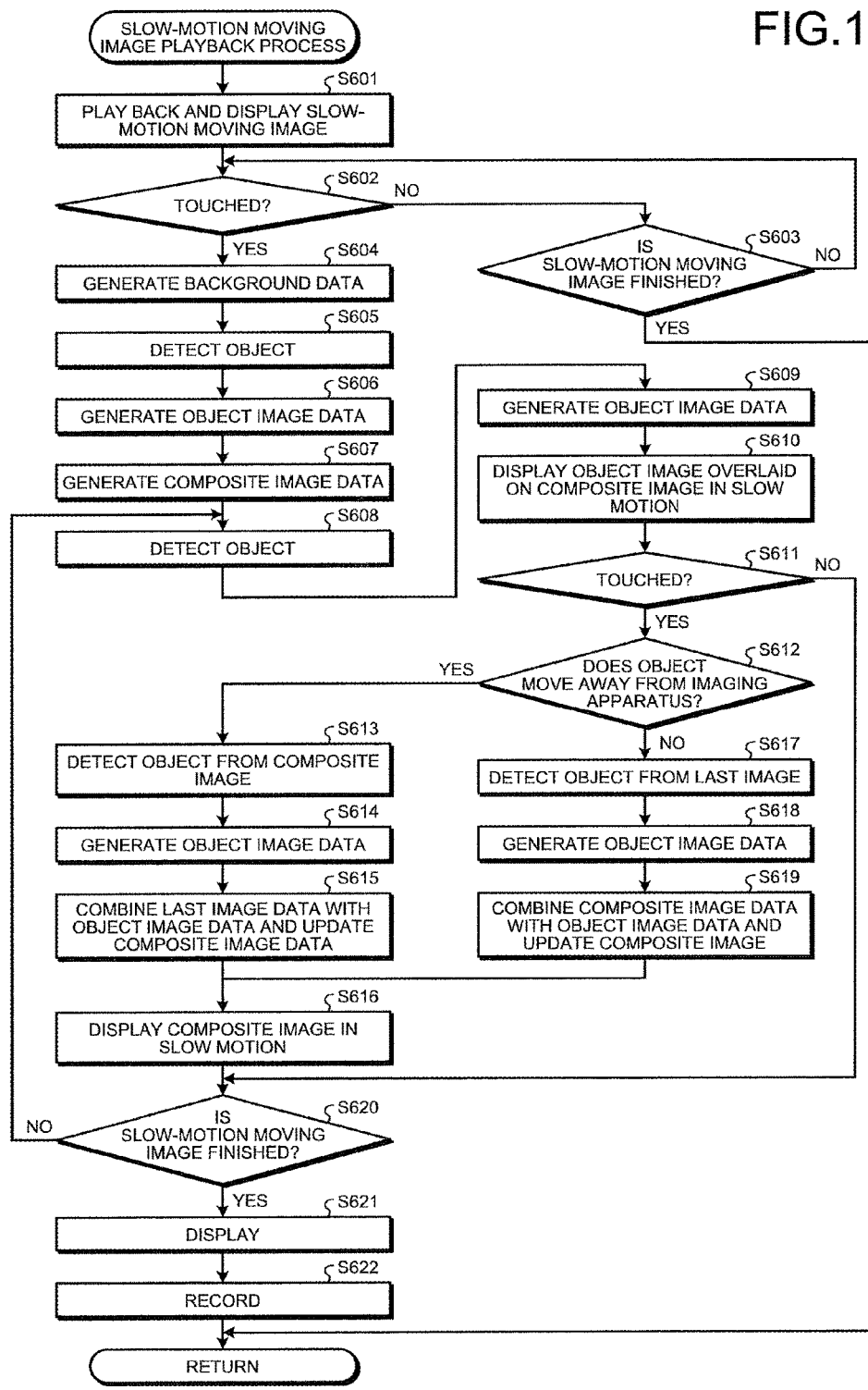
FIG. 10 is a flowchart illustrating an outline of a slow-motion moving image playback process of FIG. 9.

Next, the slow-motion moving image playback process in Step S503 of FIG. 9 described above will be described in detail. FIG. 10 is a flowchart illustrating an outline of the slow-motion moving image playback process.

As illustrated in FIG. 10, first, the display control unit 126 causes the display unit 6 to play back and display a slow-motion moving image corresponding to slow-motion moving image data (Step S601).

Then, when the touch panel 7 is touched (Step S602: Yes), the imaging apparatus 1 proceeds to Step S604, which is described later. In contrast, when the touch panel 7 is not touched (Step S602: No), the imaging apparatus 1 proceeds to Step S603, which is described later.

In Step S603, when the playback of the slow-motion moving image is finished (Step S603: Yes), the imaging apparatus 1 returns to a subroutine of the playback process of FIG. 9. In contrast, when the playback of the slow-motion moving image is not finished (Step S603: No), the imaging apparatus 1 returns to Step S602 described above.

Step S604 to Step S610 correspond to Step S205 to Step S211 of FIG. 3 described above, respectively.

In Step S611, when a moving image displayed in slow motion by the display unit 6 is touched via the touch panel 7 (Step S611: Yes), the imaging apparatus 1 proceeds to Step S612, which is described later. In contrast, when a moving image displayed in slow motion by the display unit 6 is not touched via the touch panel 7 (Step S611: No), the imaging apparatus 1 proceeds to Step S620, which is described later.

Step S612 to Step S619 correspond to Step S213 to Step S217 of FIG. 3 described above, respectively. After Step S619, the imaging apparatus 1 proceeds to Step S616.

Then, when the playback of the slow-motion moving image is finished (Step S620: Yes), the imaging apparatus 1 proceeds to Step S621, which is described later. In contrast, when the playback of the slow-motion moving image is not finished (Step S620: No), the imaging apparatus 1 returns to Step S608 described above.

Step S621 and Step S622 correspond to Step S222 and Step S223 of FIG. 3 described above, respectively. After Step S622, the imaging apparatus 1 returns to the subroutine of the playback process of FIG. 9.

Composite Image Playback Process

Figure 11:
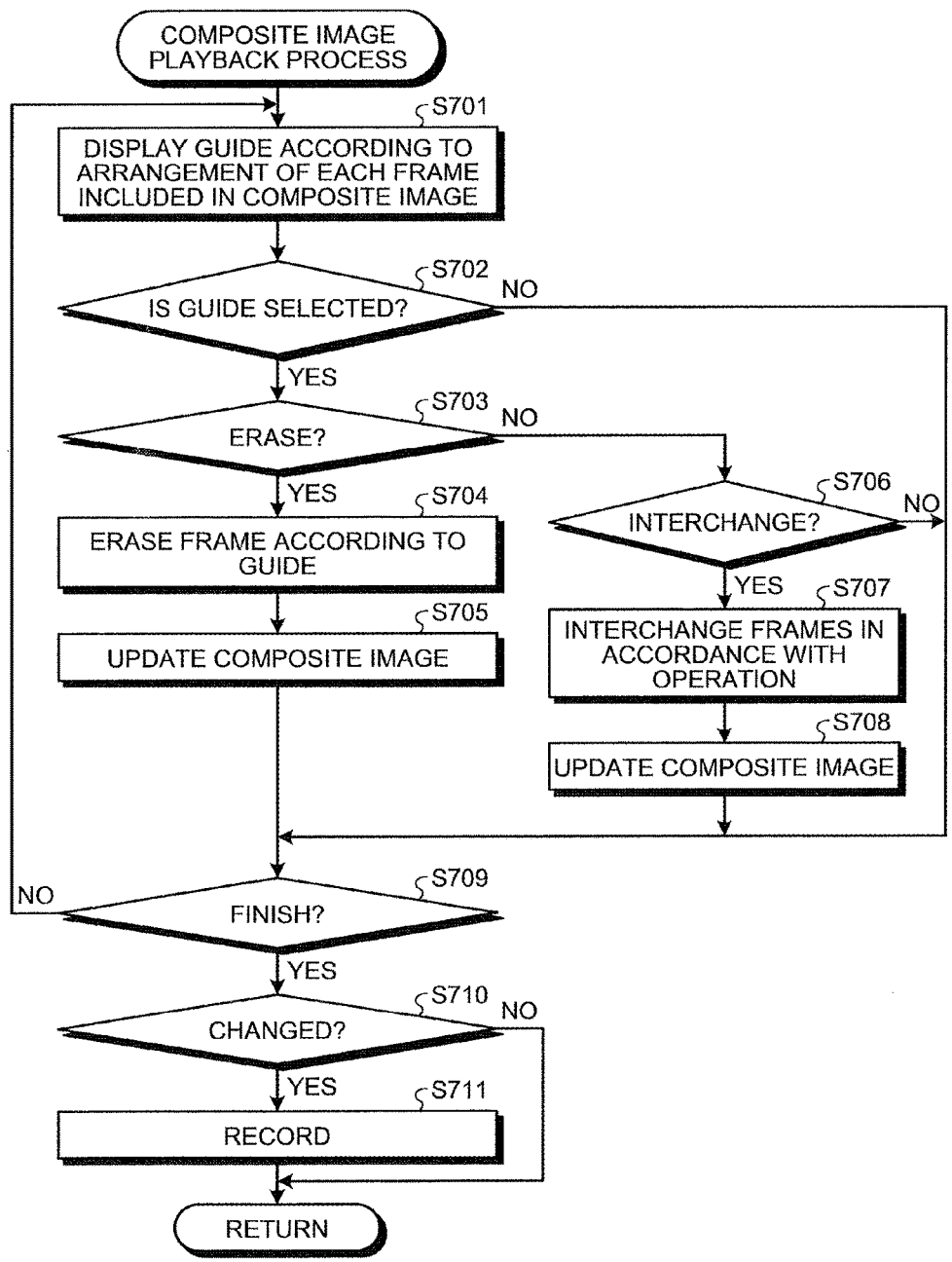
FIG. 11 is a flowchart illustrating an outline of a composite image playback process of FIG. 9.

Next, the composite image playback process in Step S507 of FIG. 9 described above will be described in detail. FIG. 11 is a flowchart illustrating an outline of the composite image playback process.

Figure 12A:
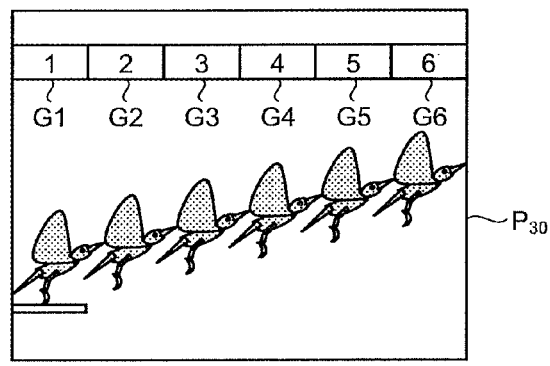
FIG. 12A is a diagram illustrating an example of a composite image displayed by a display unit of the imaging apparatus according to the second embodiment.

As illustrated in FIG. 11, first, the display control unit 126 causes the display unit 6 to display a guide according to the arrangement of a frame included in a composite image (Step S701). Specifically, as illustrated in FIG. 12A, the display control unit 126 causes the display unit 6 to display guides G1 to G6 according to the arrangement of frames included in a composite image $P_{30}$ and the composite image $P_{30}$. Note that the display control unit 126 causes the display unit 6 to display the guides G1 to G6 functioning as frame information, at positions corresponding to the positions of the object detected by the detection unit 122. Thus, the user can intuitively understand a frame according to the object.

Figure 12B:
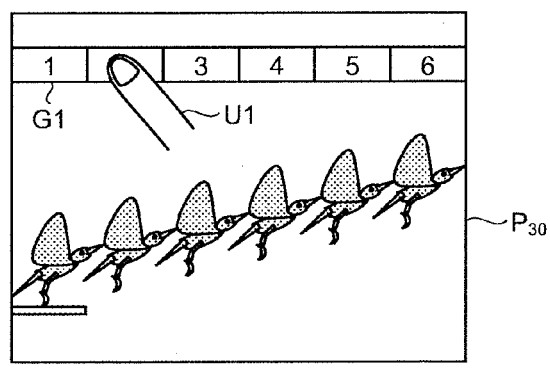
FIG. 12B is a diagram illustrating an example of the composite image displayed by the display unit of the imaging apparatus according to the second embodiment.

Then, the control unit 12 determines whether any of the guides displayed by the display unit 6 is selected via the touch panel 7 or the operating unit 8 (Step S702). For example, as illustrated in FIG. 12B, the control unit 12 determines whether the user U1 selects the guide G2 from the guides displayed by the display unit 6, via the touch panel 7. When the control unit 12 determines that any of the guides displayed by the display unit 6 is selected via the touch panel 7 or the operating unit 8 (Step S702: Yes), the imaging apparatus 1 proceeds to Step S703, which is described later. In contrast, when the control unit 12 determines that any of the guides displayed by the display unit 6 is not selected via the touch panel 7 or the operating unit 8 (Step S702: No), the imaging apparatus 1 proceeds to Step S709, which is described later.

Figure 12C:
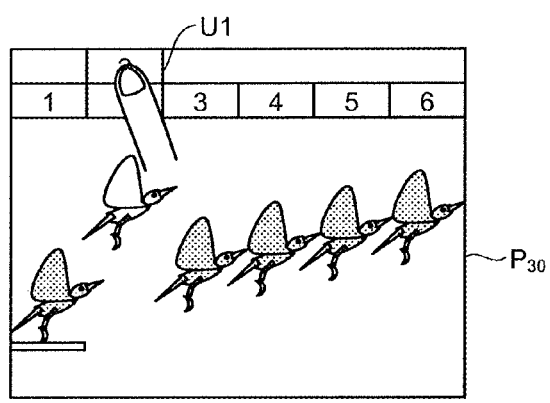
FIG. 12C is a diagram illustrating an example of the composite image displayed by the display unit of the imaging apparatus according to the second embodiment.
Figure 12D:
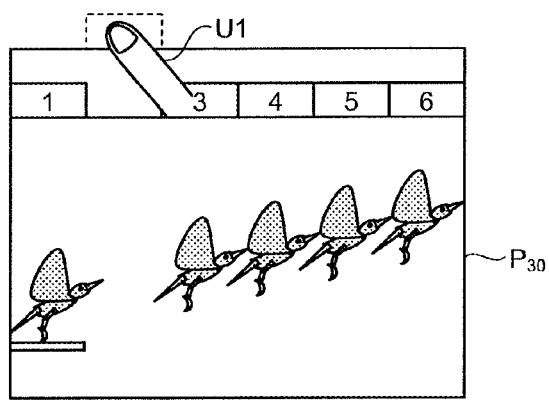
FIG. 12D is a diagram illustrating an example of the composite image displayed by the display unit of the imaging apparatus according to the second embodiment.
Figure 12E:
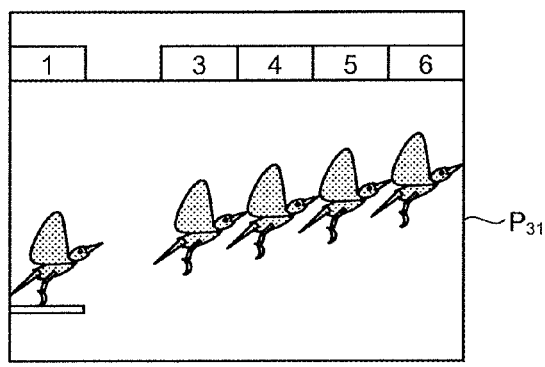
FIG. 12E is a diagram illustrating an example of the composite image displayed by the display unit of the imaging apparatus according to the second embodiment.

In Step S703, when image data of a frame corresponding to a guide selected via the touch panel 7 or the operating unit 8 is erased (Step S703: Yes), the combining unit 125 erases the image data of the frame corresponding to the guide selected via the touch panel 7 or the operating unit 8 (Step S704). Specifically, as illustrated in FIG. 12C to FIG. 12E, when the user U1 moves the guide G2 to the outside of the display area of the display unit 6 while touching the guide G2 via the touch panel 7, image data of a frame corresponding to the guide G2 is erased from composite image data by the combining unit 125, and the composite image is updated to a composite image $P_{31}$ corresponding to the composite image data. Thus, the user can select and operate a desired guide to generate image data of a desired frame as the composite image data.

Then, the display control unit 126 updates a composite image displayed by the display unit 6 (Step S705). After Step S705, the imaging apparatus 1 proceeds to Step S709, which is described later.

In Step S703, when no image data of a frame corresponding to a guide selected via the touch panel 7 or the operating unit 8 is erased (Step S703: No), the imaging apparatus 1 proceeds to Step S706, which is described later.

Then, when frames are interchanged in position in the composite image in accordance with the operation of guides selected via the touch panel 7 or the operating unit 8 (Step S706: Yes), the combining unit 125 interchanges the frames in position, in accordance with the operation of the guides selected via the touch panel 7 or the operating unit 8 (Step S707).

Then, the display control unit 126 updates the composite image displayed by the display unit 6 to a composite image corresponding to composite image data in which the frames are interchanged in position by the combining unit 125 (Step S708).

Then, an instruction signal for finishing editing the composite image is input from the touch panel 7 or the operating unit 8 (Step S709: Yes), the imaging apparatus 1 proceeds to Step S710, which is described later. In contrast, no instruction signal for finishing editing the composite image is input from the touch panel 7 or the operating unit 8 (Step S709: No), the imaging apparatus 1 returns to Step S701 described above.

In Step S710, when the composite image has a change (Step S710: Yes), the recording control unit 128 records composite image data corresponding to the composite image having a change, in the image data recording unit 102 (Step S711). After Step S711, the imaging apparatus 1 returns to the subroutine of the playback process of FIG. 9 described above.

In Step S710, when the composite image has no change (Step S710: No), the imaging apparatus 1 returns to the subroutine of the playback process of FIG. 9 described above.

In Step S706, when no frame is interchanged in position in accordance with the operation of a guide selected via the touch panel 7 or the operating unit 8 (Step S706: No), the imaging apparatus 1 proceeds to Step S709.

According to the second embodiment described above, effects similar to those of the first embodiment described above are provided, enabling acquisition of a composite image in which a position or a state of a main object desired by the user is reflected.

Furthermore, according to the second embodiment, the display control unit 126 causes the display unit 6 to display a plurality of sets of frame information, as guide information, overlaid on the composite image. The plurality of sets of frame information represents frame numbers of a plurality of image data sets included in a composite image generated by the combining unit 125. Thus, the user can intuitively understand a desired frame.

Furthermore, according to the second embodiment, the imaging control unit 127 causes the combining unit 125 to combine two or more image data sets selected in accordance with selection of a guide as the frame information by the operating unit 8 or the touch panel 7 to generate composite image data. Thus, a composite image in which a position or a state of a main object desired by the user is reflected can be obtained.

Figure 13A:
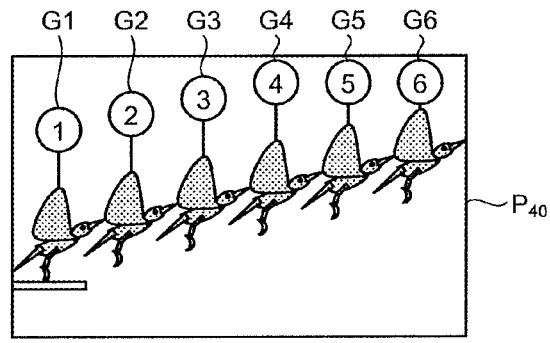
FIG. 13A is a diagram illustrating an example of another composite image displayed by the display unit of the imaging apparatus according to the second embodiment.
Figure 13B:
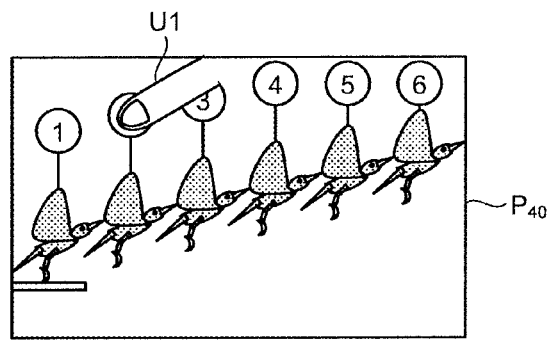
FIG. 13B is a diagram illustrating an example of the other composite image displayed by the display unit of the imaging apparatus according to the second embodiment.
Figure 13C:
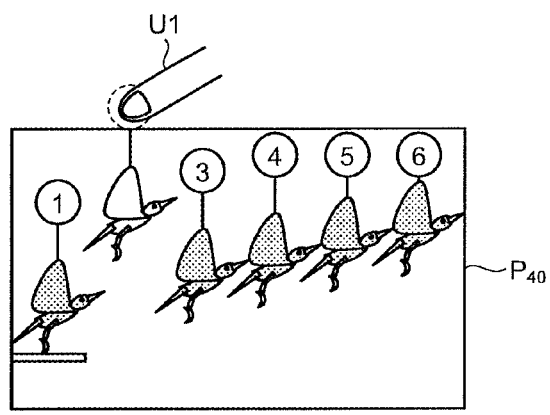
FIG. 13C is a diagram illustrating an example of the other composite image displayed by the display unit of the imaging apparatus according to the second embodiment.
Figure 13D:
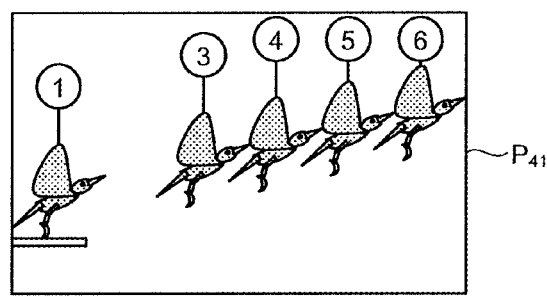
FIG. 13D is a diagram illustrating an example of the other composite image displayed by the display unit of the imaging apparatus according to the second embodiment.

Note that, in the second embodiment, the display control unit 126 causes the display unit 6 to display the composite image $P_{30}$ and the guides G1 to G6 according to the arrangement of the frames included in the composite image $P_{30}$, but a display method for the guides may be appropriately changed. For example, as illustrated in FIG. 13A, the display control unit 126 may cause the display unit 6 to display information overlaid on the composite image $P_{40}$. In the information, the objects in the frames included in a composite image $P_{40}$ are associated with the guides G1 to G6. Therefore, the user U1 is required to touch and operate a desired guide (in the order of FIG. 13B, FIG. 13C, and FIG. 13D) to generate, from the composite image $P_{40}$, a composite image $P_{41}$ in which a desired object is left.

Modifications of Second Embodiment

Next, modifications of the second embodiment will be described. An imaging apparatus according to a modification of the present second embodiment is different from the imaging apparatus 1 according to the second embodiment in configuration, and a composite image playback process performed by the imaging apparatus according to a modification of the present second embodiment is different from the composite image playback process performed by the imaging apparatus 1 according to the second embodiment. Specifically, according to the second embodiment described above, the guides are each displayed in accordance with the position of the object in a frame included in a composite image, but, according to a modification of the present second embodiment, the guides are displayed in accordance with a distance to an object and a position of the object in each frame included in a composite image. After description of the configuration of the imaging apparatus according to a modification of the present second embodiment, the composite image playback process performed by the imaging apparatus according to a modification of the present second embodiment will be described in detail below. Note that configurations the same as those of the above-described imaging apparatus 1 according to the second embodiment are denoted by the same reference signs, and the description thereof will be omitted.

Configuration of Imaging Apparatus

Figure 14:
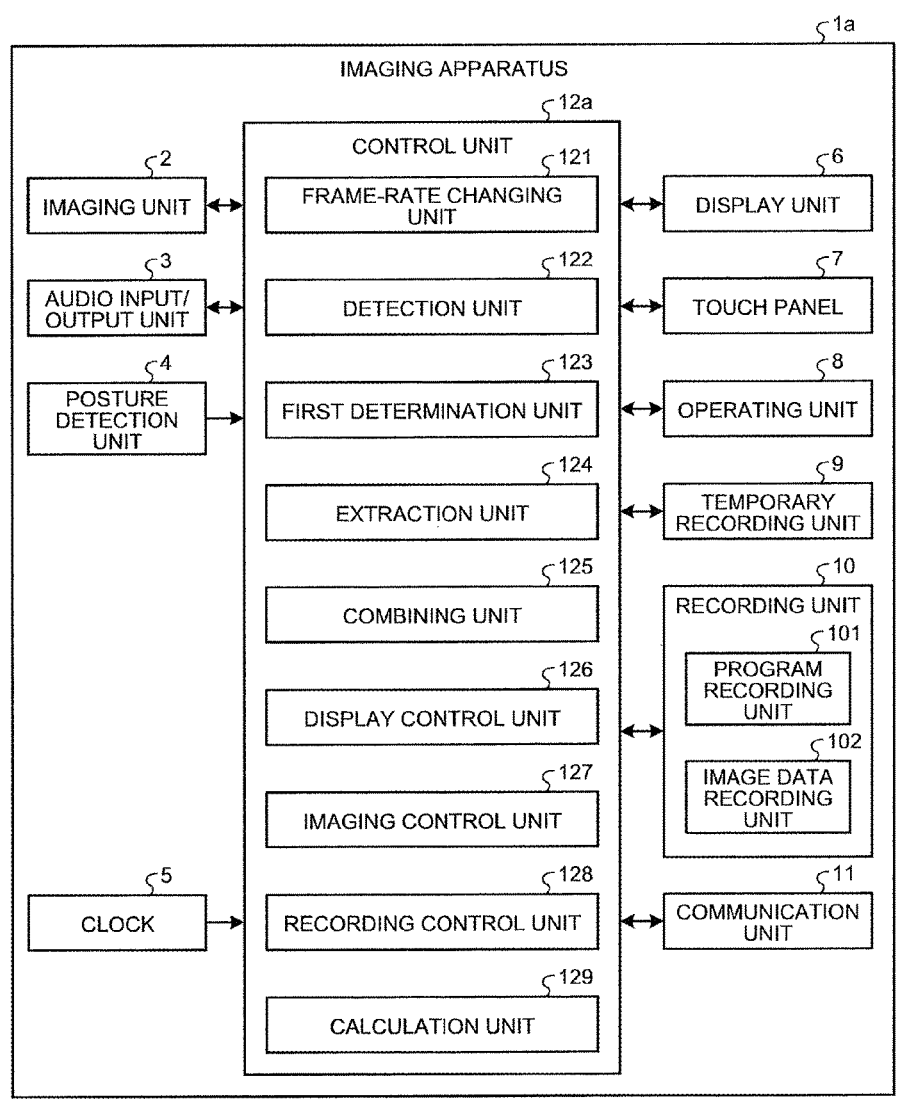
FIG. 14 is a block diagram illustrating a functional configuration of an imaging apparatus according to a modification of the second embodiment.

FIG. 14 is a block diagram illustrating a functional configuration of the imaging apparatus according to a modification of the second embodiment. An imaging apparatus 1a illustrated in FIG. 14 includes a control unit 12a instead of the control unit 12 of the imaging apparatus 1 according to the second embodiment described above.

The control unit 12a integrally controls the respective units constituting the imaging apparatus 1a. The control unit 12a includes a general-purpose processor, such as a CPU, an FPGA, or an ASIC. The control unit 12a further includes a calculation unit 129, in addition to the configuration of the control unit 12 according to the second embodiment described above.

The calculation unit 129 calculates a distance from the imaging apparatus 1a to an object in each frame detected by the detection unit 122. Specifically, the calculation unit 129 detects the distance to the object detected by the detection unit 122, based on temporally successive image data. Note that the calculation unit 129 may calculate the distance from the imaging apparatus 1a to the object by using a well-known technique, in addition to use of the temporally successive image data. The calculation unit 129 may use a frame subtraction method or the like to calculate the distance from the imaging apparatus 1a to the object for each of frames included in a composite image.

Composite Image Playback Process

Figure 15:
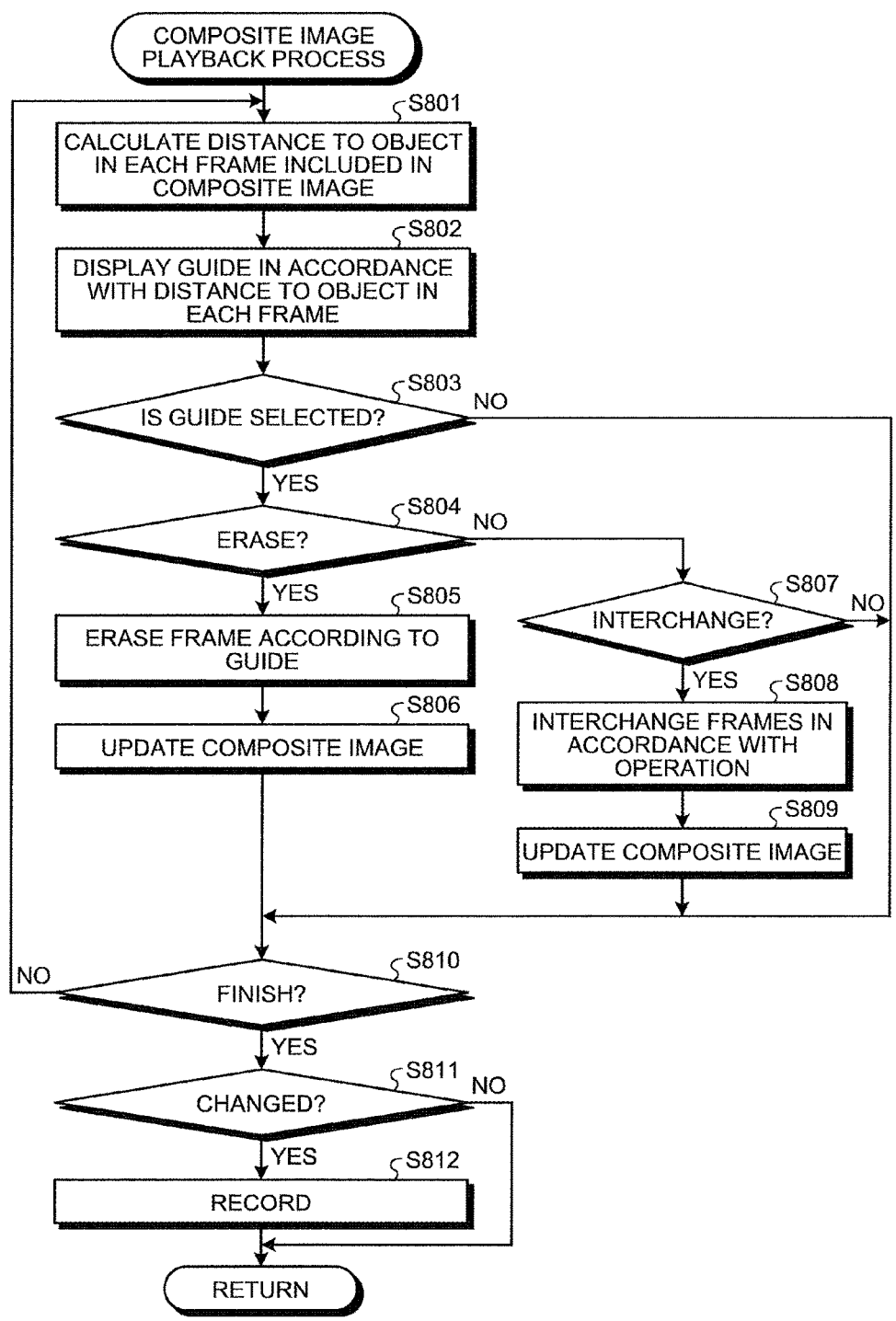
FIG. 15 is a flowchart illustrating an outline of a composite image playback process performed by the imaging apparatus according to a modification of the second embodiment.
Figure 16:
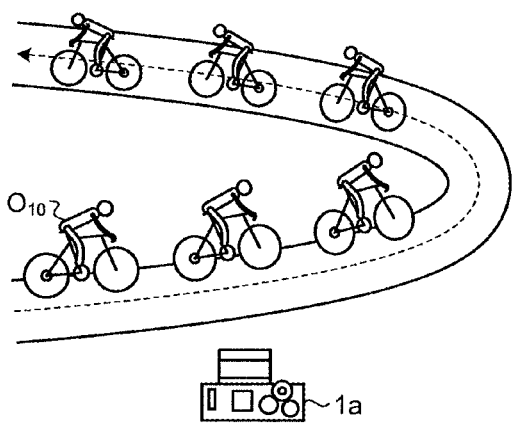
FIG. 16 is a diagram illustrating a state in which an image is captured using the imaging apparatus according to a modification of the second embodiment.

Next, the composite image playback process performed by the imaging apparatus 1a will be described. FIG. 15 is a flowchart illustrating an outline of the composite image playback process performed by the imaging apparatus 1a. Note that, as illustrated in FIG. 16, composite image data obtained by combining a plurality of image data sets (e.g., six frames) by the combining unit 125 will be described below. The image data sets are generated by imaging the object $O_{10}$ moving on a predetermined circuit road by the imaging apparatus 1a.

As illustrated in FIG. 15, first, the calculation unit 129 calculates a distance to the object in each frame included in a composite image generated by the combining unit 125 in a state of FIG. 16 as described above (Step S801).

Figure 17A:
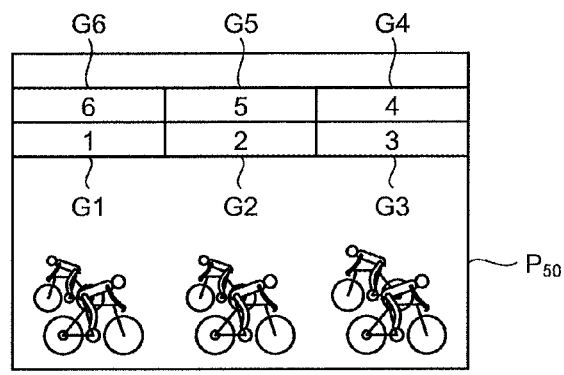
FIG. 17A is a diagram illustrating an example of a composite image displayed by a display unit of the imaging apparatus according to a modification of the second embodiment.

Then, the display control unit 126 causes the display unit 6 to display a guide in accordance with the distance to the object in each frame calculated by the calculation unit 129 (Step S802). Specifically, as illustrated in FIG. 17A, in accordance with the distance to the object in each frame calculated by the calculation unit 129, the display control unit 126 causes the display unit 6 to display the guides G1 to G6 overlaid on a composite image $P_{50}$. In this configuration, as illustrated in FIG. 16, since the calculation unit 129 calculates that the object included in a frame closer to the first frame is closer to the imaging apparatus 1a, the display control unit 126 causes the display unit 6 to display the guides G1 to G3 corresponding to the first three frames in a lower display area, and to display the guides G4 to G6 corresponding to the last three frames in an upper display area. Furthermore, the display control unit 126 causes the display unit 6 to display the guides G1 to G6, reflecting a positional relationship of the object between the respective frames. Thus, the user can intuitively understand the distance to the object included in each frame of the composite image $P_{50}$ and a positional relationship of the object between the respective frames of the composite image $P_{50}$.

Step S803 to Step S806 correspond to Step S702 to Step S705 of FIG. 11 described above, respectively.

Figure 17B:
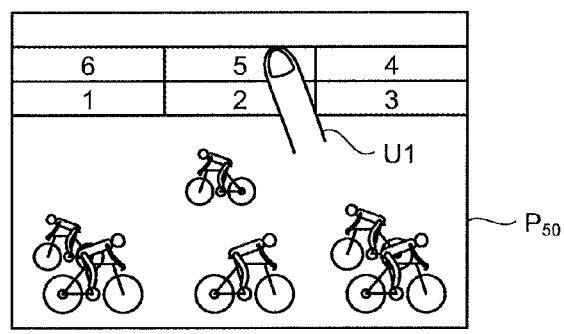
FIG. 17B is a diagram illustrating an example of the composite image displayed by the display unit of the imaging apparatus according to a modification of the second embodiment.
Figure 17C:
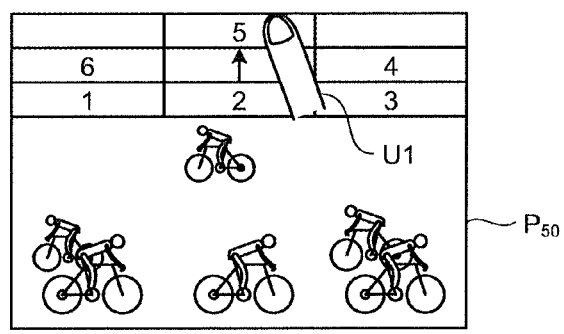
FIG. 17C is a diagram illustrating an example of the composite image displayed by the display unit of the imaging apparatus according to a modification of the second embodiment.
Figure 17D:
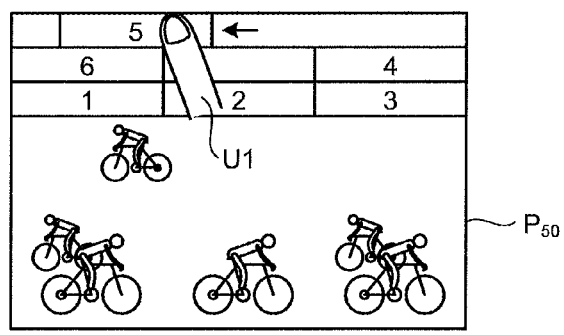
FIG. 17D is a diagram illustrating an example of the composite image displayed by the display unit of the imaging apparatus according to a modification of the second embodiment.
Figure 17E:
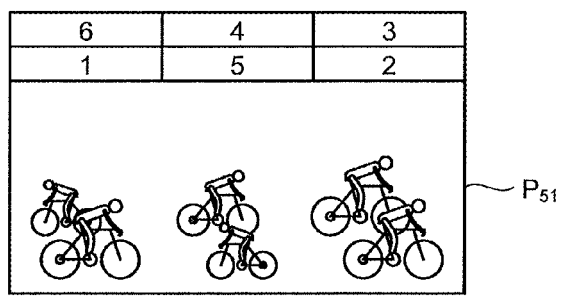
FIG. 17E is a diagram illustrating an example of the composite image displayed by the display unit of the imaging apparatus according to a modification of the second embodiment.

In Step S807, when frames are interchanged in position in the composite image in accordance with the operation of guides selected via the touch panel 7 or the operating unit 8 (Step S807: Yes), the combining unit 125 interchanges the frames in position, in accordance with the operation of the guides selected via the touch panel 7 or the operating unit 8 (Step S808). Specifically, as illustrated in FIG. 17B, when the user U1 selects the guide G5 via the touch panel 7 to insert the guide G5 between the guide G1 and the guide G2 (in the order of FIG. 17B, FIG. 17C, FIG. 17D, and FIG. 17E), the combining unit 125 interchanges the positions of the frames in the composite image. Thus, the user can obtain a composite image $P_{51}$ in which the object is moved to a desired position.

Then, the display control unit 126 updates the composite image displayed by the display unit 6 to a composite image corresponding to composite image data in which the frames are interchanged in position by the combining unit 125 (Step S809).

Step S810 to Step S812 correspond to Step S709 to Step S711 described above, respectively. After Step S812, the imaging apparatus 1a returns to the subroutine of the playback process of FIG. 9 described above.

According to a modification of the second embodiment described above, effects similar to those of the first embodiment described above are provided, enabling acquisition of a composite image in which a position or a state of a main object desired by the user is reflected.

Furthermore, according to a modification of the second embodiment, since the display control unit 126 causes the display unit 6 to display the guides as the frame information, while reflecting a positional relationship of the object between the respective frames. Thus, the user can intuitively understand the distance to the object included in each frame of a composite image and a positional relationship of the object between the respective frames of the composite image.

Third Embodiment

Next, a third embodiment will be described. An imaging apparatus according to the present third embodiment is different from the imaging apparatus 1 according to the first embodiment described above in configuration, and a selection mode process performed by the imaging apparatus according to the present third embodiment is different from the selection mode process performed by the imaging apparatus 1 according to the first embodiment. Specifically, in the first embodiment described above, an imaging area of the imaging apparatus 1 (field of view) is fixed, but in the present third embodiment, the imaging area of the imaging apparatus is moved to follow the movement of the object by moving the imaging apparatus by the user in accordance with the movement of the object. After description of the configuration of the imaging apparatus according to the present third embodiment, the selection mode process performed by the imaging apparatus according to the present third embodiment will be described below. Note that configurations the same as those of the above-described imaging apparatus 1 according to the first embodiment are denoted by the same reference signs, and the description thereof will be omitted.

Configuration of Imaging Apparatus

Figure 18:
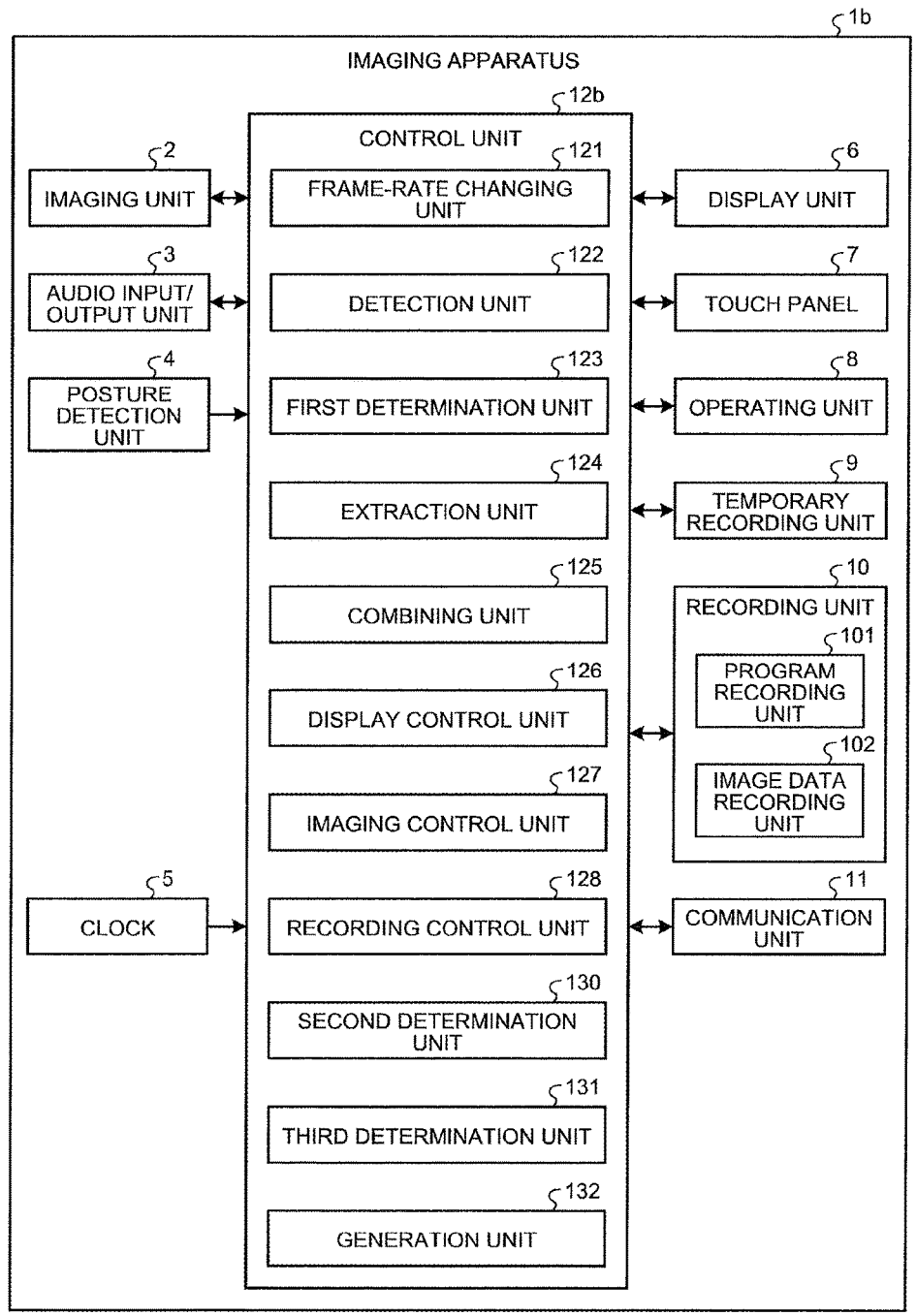
FIG. 18 is a block diagram illustrating a functional configuration of an imaging apparatus according to a third embodiment.

FIG. 18 is a block diagram illustrating a functional configuration of the imaging apparatus according to the third embodiment. An imaging apparatus 1b illustrated in FIG. 18 includes a control unit 12b instead of the control unit 12 of the imaging apparatus 1 according to the first embodiment described above.

The control unit 12b integrally controls the respective units constituting the imaging apparatus 1b. The control unit 12b includes a general-purpose processor, such as a CPU, an FPGA, or an ASIC. The control unit 12b further includes a second determination unit 130, a third determination unit 131, and a generation unit 132, in addition to the configuration of the control unit 12 according to the first embodiment described above.

The second determination unit 130 determines, based on temporally successive image data, whether an imaging area of the imaging unit 2 is changed.

The third determination unit 131 determines whether an imaging area displaying the last image overlaps with an imaging area displaying a composite image.

When the third determination unit 131 determines that an imaging area displaying the last image does not overlap with an imaging area displaying a composite image, the generation unit 132 generates an interpolation image for interpolation of an area between the imaging area displaying the last image and the imaging area displaying a composite image.

Selection Mode Process

Figure 19:
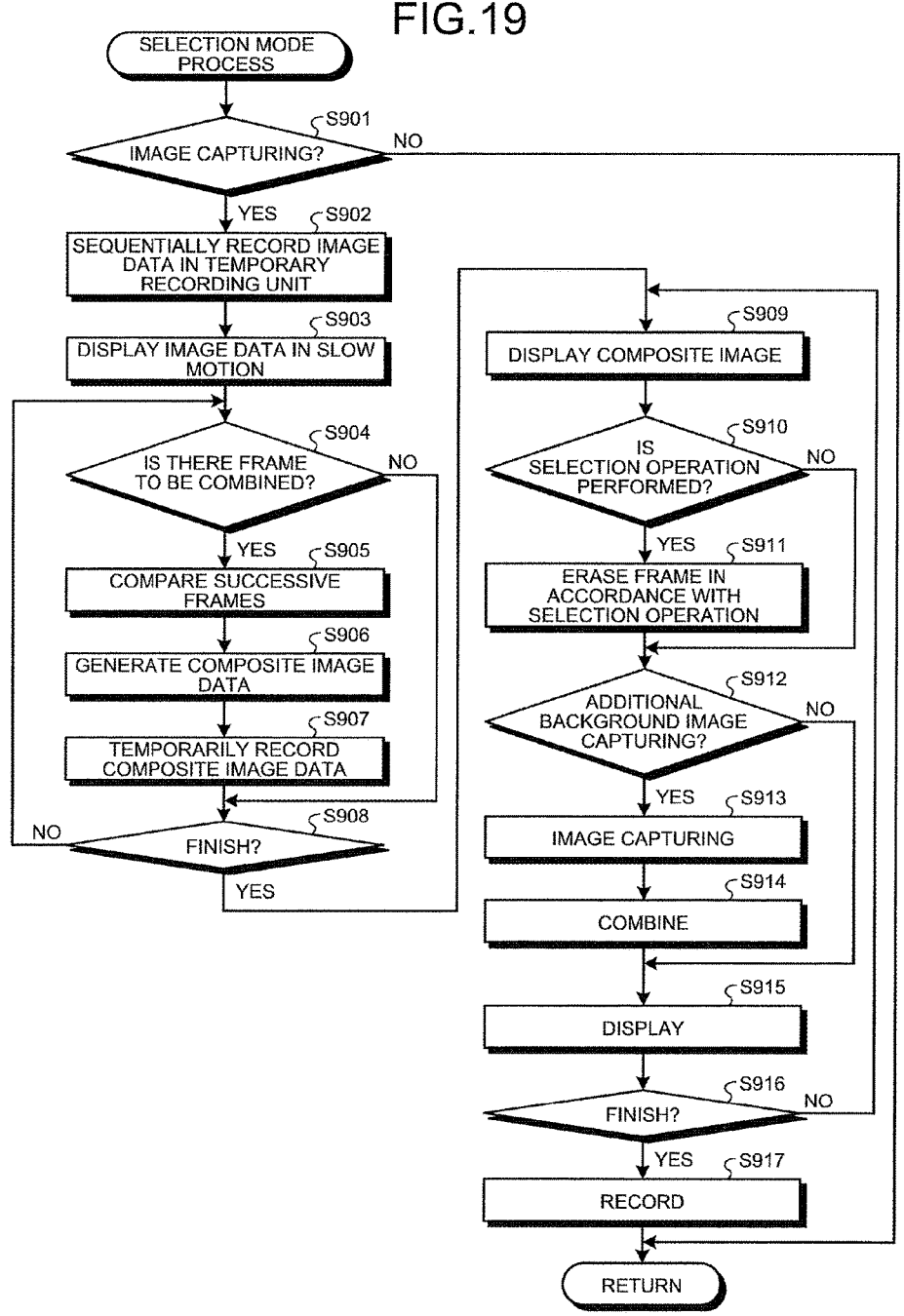
FIG. 19 is a flowchart illustrating an outline of a selection mode process performed by the imaging apparatus according to the third embodiment.
Figure 20:
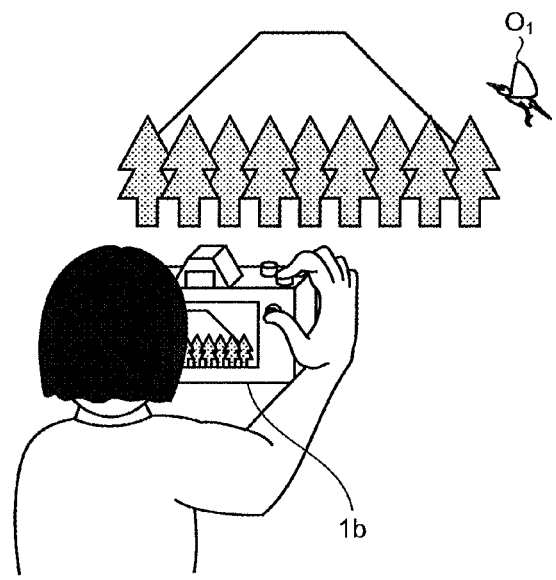
FIG. 20 is a diagram illustrating a state in which a user follows an object moving in a predetermined direction to capture images of an object by using the imaging apparatus.

Next, the selection mode process performed by the imaging apparatus 1b will be described. FIG. 19 is a flowchart illustrating an outline of the selection mode process performed by the imaging apparatus 1b. FIG. 20 is a diagram illustrating a state in which the user follows an object $O_1$ moving in a predetermined direction to capture images of the object by using the imaging apparatus 1b. Note that the selection mode process performed by the imaging apparatus 1b in a state of FIG. 20 will be described below.

As illustrated in FIG. 19, first, the control unit 12b determines whether an instruction signal for performing image capturing is input from the operating unit 8 or the touch panel 7 (Step S901). When the control unit 12b determines that the instruction signal for performing image capturing is input from the operating unit 8 or the touch panel 7 (Step S901: Yes), the imaging apparatus 1b proceeds to Step S902, which is described later. In contrast, when the control unit 12b determines that no instruction signal for performing image capturing is input from the operating unit 8 or the touch panel 7 (Step S901: No), the imaging apparatus 1b returns to the main routine of FIG. 2 described above.

In Step S902, the recording control unit 128 causes the temporary recording unit 9 to sequentially record image data generated by the imaging unit 2.

Then, the display control unit 126 causes the display unit 6 to display a plurality of image data sets recorded in the temporary recording unit 9 in slow motion (Step S903).

Then, when frames to be combined are in the plurality of image data sets recorded in the temporary recording unit 9 (Step S904: Yes), the second determination unit 130 compares two temporally successive frames with each other (Step S905). Specifically, the second determination unit 130 compares the two temporally successive frames with each other to determine whether the imaging area of the imaging unit 2 changes.

Figure 21:
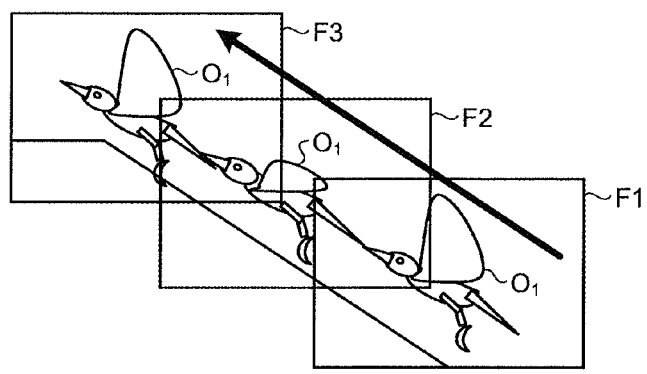
FIG. 21 is a diagram illustrating an example of a composite image combined by a combining unit of the imaging apparatus according to the third embodiment.
Figure 22:
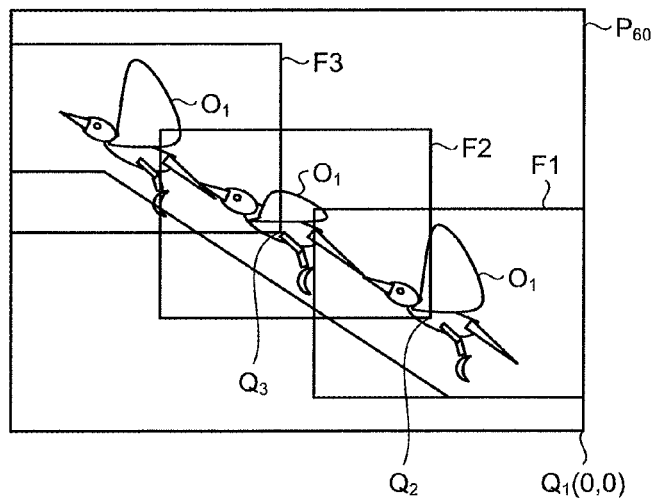
FIG. 22 is a diagram illustrating an example of the composite image combined by the combining unit of the imaging apparatus according to the third embodiment.

Then, depending on the result of the determination by the second determination unit 130, the combining unit 125 overlays corresponding portions of the peripheral portions of the two temporally successive frames on each other to generate composite image data (Step S906). For example, as illustrated in FIG. 21, the combining unit 125 overlays corresponding portions of the peripheral portions on each other in images corresponding to image data of a plurality of temporally successive frames F1 to F3 to generate composite image data. In this configuration, as illustrated in FIG. 22, when a predetermined position of an image $P_{60}$ having a predetermined size is defined as the origin $Q_1$ (0.0), the combining unit 125 calculates coordinates $Q_2$ to $Q_3$ (pixel coordinates) of portions where the frames F1 to F3 overlap each other. Note that, in FIG. 22, a horizontal direction of the image $P_{60}$ is defined as X and a vertical direction thereof is defined as Y.

Then, the recording control unit 128 temporarily records the composite image data generated by the combining unit 125 in the temporary recording unit 9 (Step S907).

Then, when an instruction signal for finishing image capturing is input via the operating unit 8 or the touch panel 7 (Step S908: Yes), the imaging apparatus 1b proceeds to Step S909, which is described later. In contrast, when no instruction signal for finishing image capturing is input via the operating unit 8 or the touch panel 7 (Step S908: No), the imaging apparatus 1b returns to Step S904 described above.

In Step S909, the display control unit 126 causes the display unit 6 to display a composite image corresponding to the composite image data temporarily recorded in the temporary recording unit 9.

Then, when a selection operation for selection is performed on image data of each frame constituting the composite image displayed by the display unit 6 via the operating unit 8 or the touch panel 7 (Step S910: Yes), the combining unit 125 erases image data of a frame from the composite image in accordance with the selection operation performed via the operating unit 8 or the touch panel 7 (Step S911). After Step S910, the imaging apparatus 1b proceeds to Step S912, which is described later.

In Step S910, when no selection operation for selection is performed on the image data of each frame constituting the composite image displayed by the display unit 6 via the operating unit 8 or the touch panel 7 (Step S910: No), the imaging apparatus 1b proceeds to Step S912, which is described later.

Then, when an instruction signal for additional background image capturing for adding a background is input to the composite image displayed by the display unit 6, via the operating unit 8 or the touch panel 7 (Step S912: Yes), the imaging control unit 127 causes the imaging unit 2 to perform image capturing (Step S913).

Figure 23:
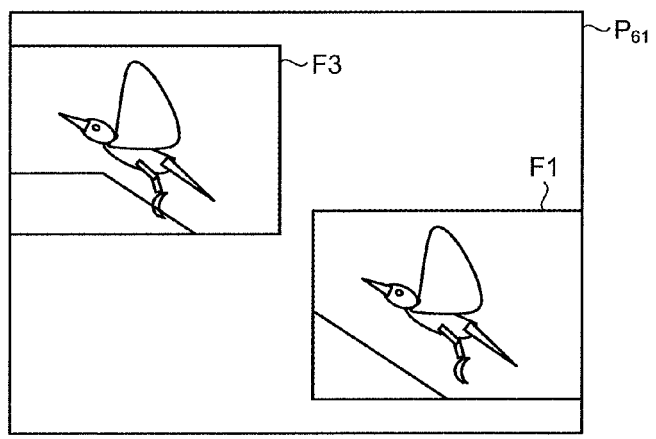
FIG. 23 is a diagram illustrating an example of another composite image combined by the combining unit of the imaging apparatus according to the third embodiment.
Figure 24:
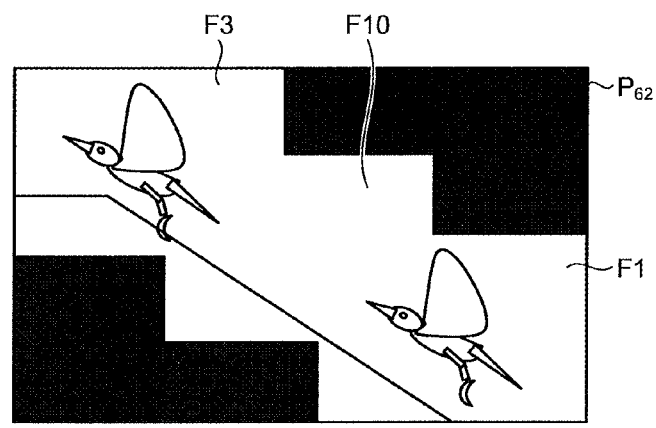
FIG. 24 is a diagram illustrating an example of the other composite image combined by the combining unit of the imaging apparatus according to the third embodiment.

Then, the combining unit 125 additionally combines image data generated by the imaging unit 2 to the composite image data (Step S914). In this case, the third determination unit 131 determines whether an imaging area displaying the last image, generated by the imaging unit 2 overlaps with an imaging area displaying a composite image, the generation unit 132 uses the image data generated by the imaging unit 2 to generate an interpolation image for interpolation of an area between the imaging area displaying the last image and the imaging area displaying a composite image, when the third determination unit 131 determines that the imaging area displaying the last image, generated by the imaging unit 2 does not overlap with the imaging area displaying a composite image, and the combining unit 125 uses the interpolation image generated by the generation unit 132 to generate composite image data in which interpolation is performed for an area where the last image does not overlap with the composite image. For example, as illustrated in FIG. 23, when the third determination unit 131 determines that an imaging area displaying the image of the frame F1 does not overlap with imaging area displaying the image of the frame F3 in a composite image $P_{61}$, the combining unit 125 combines an interpolation image F10 generated by the generation unit 132 using image data to generate a composite image $P_{62}$, as illustrated in FIG. 24. Thus, a natural composite image having continuous imaging area can be obtained.

Then, the display control unit 126 causes the display unit 6 to display the composite image corresponding to the composite image data added by the combining unit 125 (Step S915).

Figure 25:
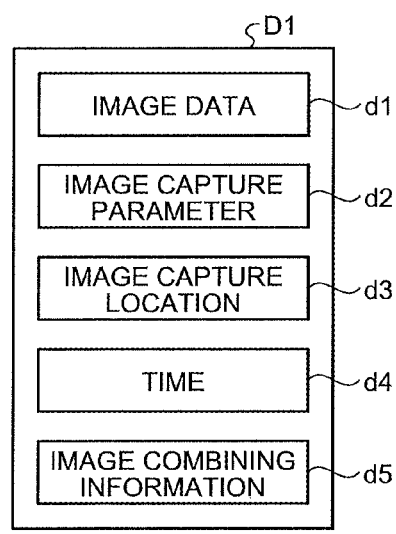
FIG. 25 is a schematic diagram illustrating an example of an image file recorded by the imaging apparatus according to the third embodiment.

Then, when an instruction signal for termination is input via the operating unit 8 or the touch panel 7 (Step S916: Yes), the recording control unit 128 records the composite image data generated by the combining unit 125 in the image data recording unit 102 (Step S917). In this configuration, as illustrated in FIG. 25, the recording control unit 128 records, in the image data recording unit 102, an image file D1 in which composite image data d1, an image capture parameter d2, an image capture location d3, time d4, and image combining information d5 are associated with each other. The composite image data d1 is generated by the combining unit 125, the image capture parameter d2 is an image capture parameter of the imaging apparatus 1b for generation of the composite image data, the image capture location d3 is an image capture location of the imaging apparatus 1b, the time d4 is time at which the composite image data is generated, and the image combining information d5 includes coordinates of combining positions at which image data of frames are combined. After Step S917, the imaging apparatus 1b returns to the main routine of FIG. 2.

In Step S912, when no instruction signal for additional background image capturing for adding a background is input to the composite image displayed by the display unit 6, via the operating unit 8 or the touch panel 7 (Step S912: No), the imaging apparatus 1b proceeds to Step S915.

In Step S916, when no instruction signal for termination is input via the operating unit 8 or the touch panel 7 (Step S916: No), the imaging apparatus 1b returns to Step S909 described above.

According to the third embodiment described above, a composite image in which a position or a state of a main object desired by the user is reflected can be obtained.

Furthermore, according to the third embodiment, the combining unit 125 overlays corresponding portions of the peripheral portions on each other in two temporally successive frames to generate composite image data, depending on the result of determination by the second determination unit 130. Thus, a composite image having an enlarged imaging area by the imaging unit 2 can be generated.

Furthermore, according to the third embodiment, when the third determination unit 131 determines that an imaging area displaying the last image, generated by the imaging unit 2 does not overlap with an imaging area displaying a composite image, the generation unit 132 uses image data generated by the imaging unit 2 to generate an interpolation image for interpolation of an area between the imaging area displaying the last image and the imaging area displaying a composite image, and the combining unit 125 uses the interpolation image generated by the generation unit 132 to generate composite image data by performing interpolation for an area in which the last image does not overlap with the composite image. Thus, a natural composite image having continuous imaging area can be obtained.

Other Embodiments

Furthermore, the imaging apparatus according to the present disclosure may be also applied to, for example, a digital video camera, an electronic device, such as a portable tablet device having an imaging function, and a display device for displaying an image corresponding to medical or industrial image data captured by an endoscope or a microscope, in addition to a digital still camera.

A program executed by the imaging apparatus according to the present disclosure is provided in the form of installable or executable file data which is recorded in a computer-readable recording medium, such as a CD-ROM, a flexible disk (FD), a CD-R, a digital versatile disk (DVD), a USB medium, or a flash memory.

Alternatively, the program executed by the imaging device according to the present disclosure may be stored on a computer connected to a network such as the Internet to be provided by being downloaded via the network. Further alternatively, the program executed by imaging apparatus according to the present disclosure may be configured to be provided or distributed via a network such as the Internet.

It is noted that, in the descriptions of the flowcharts in the specification, a context between the steps has been described using expressions, such as "first", "then", and "next", but the order of a process necessary to carry out the present disclosure is not uniquely defined by the expressions. That is, the order of the processes in the flowcharts described in the present specification may be altered or modified within a range without contradiction.

According to the present disclosure, a position or a state of an object which is desired by a user is effectively reflected.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit configured to continuously capture images to sequentially generate image data;
a combining unit configured to combine a plurality of sets of the image data generated by the imaging unit to generate composite image data;
a display unit configured to display a composite image corresponding to the composite image data generated by the combining unit;
an operating unit configured to receive an operation for the image data to be left in the composite image selected from among a plurality of sets of the image data combined into the composite image displayed by the display unit;
a control unit configured to cause the combining unit to combine at least two sets of the image data selected in accordance with the operation of the operating unit to generate a new set of the composite image data; and
a display control unit configured to cause the display unit to display a last image overlaid on the composite image, whenever the imaging unit generates the image data, the last image corresponding to a last set of the image data generated by the imaging unit, the composite image being generated by the combining unit,
wherein the display control unit causes the display unit to display the composite image and the last image, in slow motion.

2. The imaging apparatus according to claim 1, wherein
the operating unit is configured to receive an input of an instruction for combining the last image overlaid on the composite image with the composite image, and
the control unit causes the combining unit to combine the last image with the composite image to update the composite image data when the operating unit receives the input of the instruction.

3. The imaging apparatus according to claim 1, further comprising:
a detection unit configured to detect an object included in the last image; and
an extraction unit configured to extract, from the last image, the object detected by the detection unit to generate object image data,
wherein the control unit causes the combining unit to combine an object image corresponding to the object image data generated by the extraction unit with the composite image to update the composite image data.

4. The imaging apparatus according to claim 3, further comprising a first determination unit configured to determine whether the object detected by the detection unit has a depth component of movement in a depth direction of the imaging apparatus, based on the image data being temporally successive,
wherein the detection unit detects the object from the composite image when the first determination unit determines that the object has the depth component,
the extraction unit extracts, from the composite image, the object detected by the detection unit to generate the object image data, and
the control unit causes the combining unit to combine the last image generated by the imaging unit with an object image corresponding to the object image data extracted from the composite image by the extraction unit to update the composite image data.

5. The imaging apparatus according to claim 1, further comprising a second determination unit configured to determine whether an imaging area of the imaging unit changes, based on the image data being temporally successive,
wherein the control unit causes the combining unit to combine an imaging area displaying the last image with an imaging area displaying the composite image, reflecting a positional relationship between the imaging areas, to update the composite image data, when the second determination unit determines that an imaging area of the imaging unit changes.

6. The imaging apparatus according to claim 5, wherein the control unit causes the combining unit to partially overlay the imaging area displaying the last image on the imaging area displaying the composite image to combine the imaging area displaying the last image with the imaging area displaying the composite image, updating the composite image data.

7. The imaging apparatus according to claim 5, further comprising:
a third determination unit configured to determine whether an imaging area displaying the last image overlaps with an imaging area displaying the composite image; and
a generation unit configured to generate an interpolation image for interpolation between an imaging area displaying the last image and an imaging area displaying the composite image when the third determination unit determines that an imaging area displaying the last image does not overlap with an imaging area displaying the composite image,
wherein the control unit causes the combining unit to combine the last image, the composite image, and the interpolation image with each other to update the composite image data.

8. An imaging apparatus comprising:
an imaging unit configured to continuously capture images to sequentially generate image data;
a combining unit configured to combine a plurality of sets of the image data generated by the imaging unit to generate composite image data;
a display unit configured to display a composite image corresponding to the composite image data generated by the combining unit;
an operating unit configured to receive an operation for the image data to be left in the composite image selected from among a plurality of sets of the image data combined into the composite image displayed by the display unit;
a control unit configured to cause the combining unit to combine at least two sets of the image data selected in accordance with the operation of the operating unit to generate a new set of the composite image data;
a display control unit configured to cause the display unit to display a plurality of sets of frame information overlaid on the composite image, the plurality of sets of frame information each representing a frame number of each of a plurality of sets of the image data combined with the composite image;
a detection unit configured to detect an object included in an image corresponding to the image data generated by the imaging unit; and a calculation unit configured to calculate a distance between the imaging apparatus and the object in each frame which is detected by the detection unit, wherein
the operating unit is configured to select any of the plurality of sets of frame information,
the control unit causes the combining unit to combine at least two sets of the image data with each other, the at least two sets of the image data being selected in accordance with selection of any of the plurality of sets of frame information by the operating unit, and
the display control unit causes the display unit to display the object in each frame detected by the detection unit and the frame information, which are associated with each other, and causes the display unit to display the object, the distance, and the frame information, which are associated with each other.

9. An imaging method executed by an imaging apparatus including an imaging unit configured to continuously capture images to sequentially generate image data, and a combining unit configured to combine a plurality of sets of the image data generated by the imaging unit to generate composite image data, the imaging method comprising:
displaying a composite image corresponding to the composite image data generated by the combining unit;
receiving an operation for the image data to be left in the composite image selected from a plurality of sets of the image data combined into the displayed composite image,
causing the combining unit to combine at least two sets of the image data selected in accordance with the operation to generate a new set of the composite image data;
displaying a last image overlaid on the composite image, whenever the imaging unit generates the image data, the last image corresponding to a last set of the image data generated by the imaging unit, the composite image being generated by the combining unit, and
displaying the composite image and the last image, in slow motion.

10. A non-transitory computer-readable recording medium on which an executable program is recorded, the program instructing an imaging apparatus including an imaging unit configured to continuously capture images to sequentially generate image data, and a combining unit configured to combine a plurality of sets of the image data generated by the imaging unit to execute:
displaying a composite image corresponding to the composite image data generated by the combining unit;
receiving an operation for the image data to be left in the composite image selected from a plurality of sets of the image data combined into the displayed composite image,
causing the combining unit to combine at least two sets of the image data selected in accordance with the operation to generate a new set of the composite image data;
displaying a last image overlaid on the composite image, whenever the imaging unit generates the image data, the last image corresponding to a last set of the image data generated by the imaging unit, the composite image being generated by the combining unit, and
displaying the composite image and the last image, in slow motion.

* * * * *